US010476966B2

(12) United States Patent
Kantake et al.

(10) Patent No.: US 10,476,966 B2
(45) Date of Patent: Nov. 12, 2019

(54) PORTABLE COMMUNICATION TERMINAL, ELECTRONIC APPARATUS, AND METHOD OF CONTROLLING ELECTRONIC APPARATUS BY USING PORTABLE COMMUNICATION TERMINAL

(71) Applicant: SHARP KABUSHIKI KAISHA, Sakai, Osaka (JP)

(72) Inventors: Kiichi Kantake, Sakai (JP); Takahiro Minami, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 11 days.

(21) Appl. No.: 15/812,328

(22) Filed: Nov. 14, 2017

(65) Prior Publication Data
US 2018/0139284 A1 May 17, 2018

(30) Foreign Application Priority Data

Nov. 14, 2016 (JP) .................. 2016-221589
Jul. 28, 2017 (JP) .................. 2017-146722

(51) Int. Cl.
G05B 19/042 (2006.01)
H04W 4/00 (2018.01)
(Continued)

(52) U.S. Cl.
CPC ........ H04L 67/125 (2013.01); G05B 19/0423 (2013.01); G06F 3/1284 (2013.01);
(Continued)

(58) Field of Classification Search
CPC ...... H04L 67/125; H04W 4/70; H04W 4/005; G05B 19/0423; G05B 15/02; G06F 3/1292; G06F 3/1284; G06F 3/1204
See application file for complete search history.

(56) References Cited

U.S. PATENT DOCUMENTS 9,641,707 B2 * 5/2017 Kanbayashi ....... H04N 1/00392
2004/0035930 A1 2/2004 Arisawa et al.
(Continued)

FOREIGN PATENT DOCUMENTS

JP 2003-141477 A 5/2003
JP 2014-186679 A 10/2014

Primary Examiner — Thomas D Alunkal
(74) Attorney, Agent, or Firm — ScienBiziP, P.C.

(57) ABSTRACT

A portable communication terminal transmits a control instruction for an electronic apparatus. The portable communication terminal includes a terminal communication unit, an inclination detecting unit, a terminal storage unit, and a terminal controller. The terminal communication unit communicates with the electronic apparatus. The inclination detecting unit detects an inclination of a base of the portable communication terminal with respect to a predetermined reference direction and a direction of the inclination. The terminal storage unit stores the control instruction associated in advance with the inclination direction. The terminal controller controls the terminal communication unit, the inclination detecting unit, and the terminal storage unit. When the inclination detecting unit detects that the base is inclined with respect to the predetermined reference direction, the terminal controller causes the terminal communication unit to transmit the control instruction to the electronic apparatus. The control instruction is associated in advance with the inclination direction.

11 Claims, 18 Drawing Sheets

(51) Int. Cl.
  *H04L 29/08* (2006.01)
  *H04W 4/70* (2018.01)
  *G06F 3/12* (2006.01)
  *H04W 4/80* (2018.01)
  *G05B 15/02* (2006.01)

(52) U.S. Cl.
  CPC ............ *G06F 3/1292* (2013.01); *H04L 67/34* (2013.01); *H04W 4/70* (2018.02); *H04W 4/80* (2018.02); *G05B 15/02* (2013.01); *G06F 3/1204* (2013.01)

(56) References Cited

U.S. PATENT DOCUMENTS

| | | | | |
|---|---|---|---|---|
| 2011/0246877 A1* | 10/2011 | Kwak | ................... | G06F 3/0488 715/702 |
| 2012/0220221 A1* | 8/2012 | Moosavi | ......... | H04M 1/274516 455/41.1 |
| 2013/0201123 A1* | 8/2013 | Jung | ..................... | G06F 3/0488 345/173 |
| 2013/0316650 A1* | 11/2013 | Reed | ........................ | H04B 7/24 455/41.2 |
| 2014/0320898 A1* | 10/2014 | Koda | ..................... | G06F 3/125 358/1.15 |
| 2015/0169272 A1* | 6/2015 | Sakai | ..................... | G06F 3/1292 358/1.15 |
| 2015/0346899 A1* | 12/2015 | Jung | ..................... | G06F 3/0416 345/173 |
| 2015/0349848 A1* | 12/2015 | Yang | ..................... | H04B 5/0031 455/41.1 |
| 2016/0077718 A1* | 3/2016 | Kwon | ..................... | G06F 1/1694 |
| 2016/0088707 A1* | 3/2016 | Van De Sluis | .... | H05B 37/0227 315/149 |
| 2016/0224289 A1* | 8/2016 | Yamanaka | ......... | H04N 1/00127 |

\* cited by examiner

PORTABLE COMMUNICATION TERMINAL, ELECTRONIC APPARATUS, AND METHOD OF CONTROLLING ELECTRONIC APPARATUS BY USING PORTABLE COMMUNICATION TERMINAL

BACKGROUND

1. Field

The present disclosure relates to a portable communication terminal, an electronic apparatus, and a method of controlling the electronic apparatus by using the portable communication terminal.

2. Description of the Related Art

Recently, technology using proximity wireless communication, such as user authentication using a noncontact integrated circuit (IC) card, and a wallet Phone®, has become popular. Proximity wireless communication is also called near field communication or NFC. In NFC, a communication available range (also referred to as a field) extends from about several centimeters to about several tens of centimeters. Standards, such as FeliCa® and MIFARE®, are defined for NFC.

In addition, technology for controlling various electronic apparatuses through such proximity wireless communication is known.

For example, the following technique has been proposed. By presenting an IC card to a card reader/writer, the IC card initiates communication with the card reader/writer through a wireless interface. Thus, a specific application in an information processing terminal is capable of being activated, and power of a controller is capable of being switched on so that operations are started (for example, see Japanese Unexamined Patent Application Publication No. 2003-141477).

In contrast, a portable communication terminal, such as a smartphone, a tablet computer or a mobile computer, has also been provided with proximity wireless communication. A technique of using such a portable communication terminal to control an electronic apparatus is known.

As an example of such a technique, a technique in which a user configures print settings through the orientation of a smartphone after the smartphone is connected to a printer through NFC communication has been proposed (for example, see Japanese Unexamined Patent Application Publication No. 2014-186679).

However, although the throughput of a portable communication terminal provided with NFC has been improved, a method of the related art for controlling an electronic apparatus is performed mainly through touch operations. Therefore, to further improve user convenience by saving time for touch operations, a new portable communication terminal, a new electronic apparatus, and a new method of controlling the electronic apparatus by using the portable communication terminal, all three of which make full use of the throughput of a portable communication terminal provided with NFC, have been desired.

SUMMARY

The present disclosure provides a portable communication terminal, an electronic apparatus, and a method of controlling the electronic apparatus by using the portable communication terminal so that intuitive, rapid control on the electronic apparatus is achieved.

According to the disclosure, there is provided a portable communication terminal that transmits a control instruction for an electronic apparatus. The portable communication terminal includes a terminal communication unit, an inclination detecting unit, a terminal storage unit, and a terminal controller. The terminal communication unit communicates with the electronic apparatus. The inclination detecting unit detects an inclination of a base of the portable communication terminal with respect to a predetermined reference direction and a direction of the inclination. The terminal storage unit stores the control instruction associated in advance with the inclination direction. The terminal controller controls the terminal communication unit, the inclination detecting unit, and the terminal storage unit. When the inclination detecting unit detects that the base is inclined with respect to the predetermined reference direction, the terminal controller causes the terminal communication unit to transmit the control instruction to the electronic apparatus. The control instruction is associated in advance with the inclination direction.

According to the disclosure, there is provided an electronic apparatus that is controlled by receiving a control instruction from a portable communication terminal. The electronic apparatus includes an apparatus communication unit and an apparatus controller. When a base of the portable communication terminal is inclined with respect to a predetermined reference direction of the base of the portable communication terminal, the apparatus communication unit receives the control instruction from the portable communication terminal. The control instruction is associated in advance with a direction of the inclination. The apparatus controller performs predetermined processing in accordance with the control instruction.

According to the disclosure, there is provided a method of controlling an electronic apparatus. The method is performed by a portable communication terminal. The method includes, by using the portable communication terminal, initiating communication when the electronic apparatus comes close within a predetermined range, then activating an application program for controlling the electronic apparatus through an inclination of a base of the portable communication terminal, and notifying a user of one or more inclination directions in which the base is to be inclined with respect to a reference direction; and, when the base is inclined in one of the one or more inclination directions, transmitting, by using the portable communication terminal, a control instruction to the electronic apparatus, the control instruction being an instruction for the electronic apparatus, the control instruction being associated in advance with the inclination direction.

According to the disclosure, there is provided a method of controlling an electronic apparatus by receiving a control instruction from a portable communication terminal. The method includes, by using the electronic apparatus, initiating communication when the portable communication terminal is brought close within a predetermined range, then transmitting an instruction to the portable communication terminal, the instruction being an instruction to activate an application program for controlling the electronic apparatus through an inclination of a base of the portable communication terminal, and notifying a user of one or more inclination directions in which the base is to be inclined with respect to a reference direction; and, when the base is inclined in one of the one or more inclination directions, receiving the control instruction from the portable communication terminal, the control instruction being associated in advance with the inclination direction, and performing predetermined processing in accordance with the control instruction.

Figure 1:
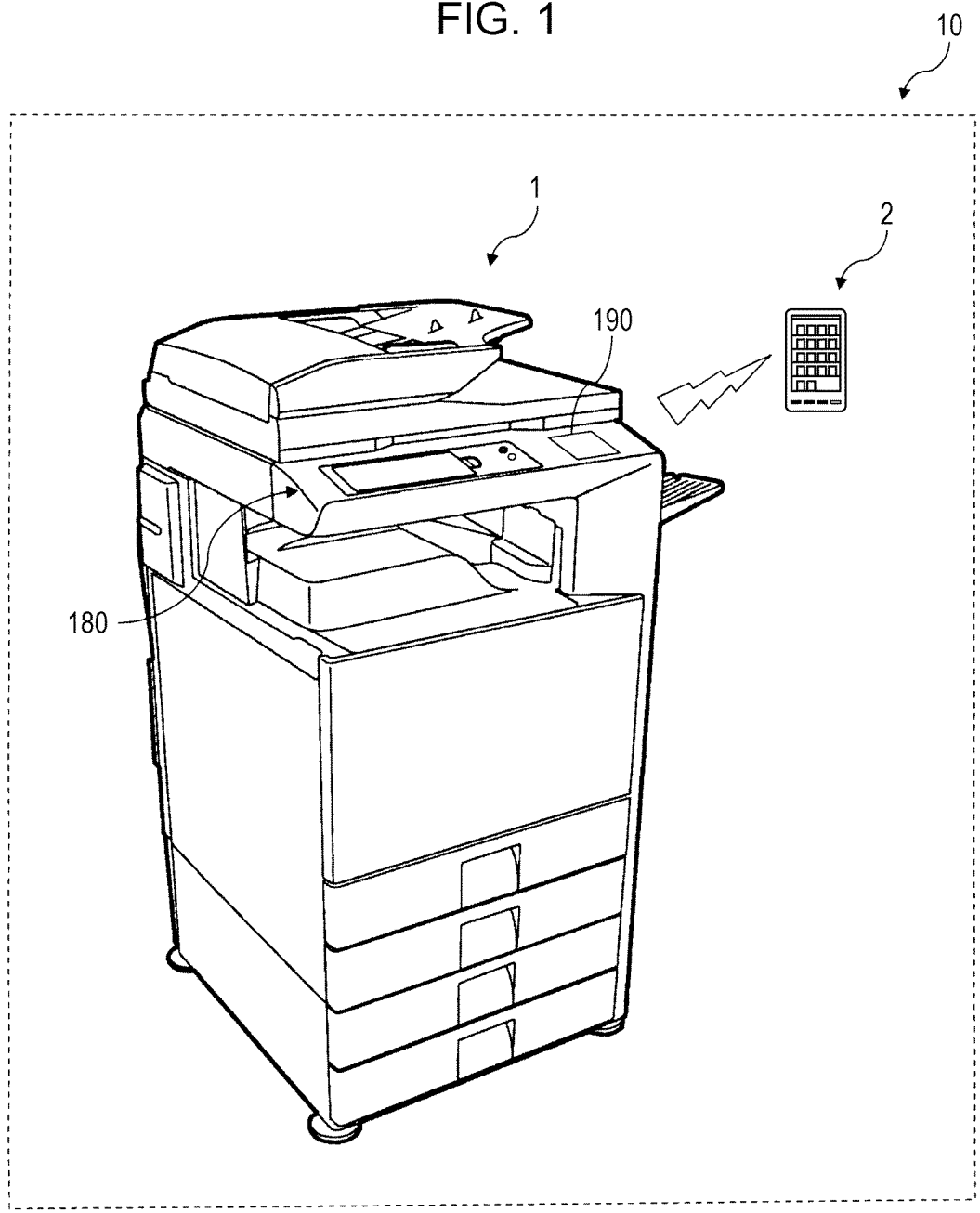
FIG. 1 is a diagram for describing the schematic configuration of a digital-multifunction-device control system including a digital multifunction device and a portable communication terminal, according to a first embodiment of the present disclosure.

DESCRIPTION OF THE EMBODIMENTS (i) A portable communication terminal according to the present disclosure transmits a control instruction for an electronic apparatus. The portable communication terminal includes a terminal communication unit, an inclination detecting unit, a terminal storage unit, and a terminal controller. The terminal communication unit communicates with the electronic apparatus. The inclination detecting unit detects an inclination of a base of the portable communication terminal with respect to a predetermined reference direction and a direction of the inclination. The terminal storage unit stores the control instruction associated in advance with the inclination direction. The terminal controller controls the terminal communication unit, the inclination detecting unit, and the terminal storage unit. When the inclination detecting unit detects that the base is inclined with respect to the predetermined reference direction, the terminal controller causes the terminal communication unit to transmit the control instruction to the electronic apparatus. The control instruction is associated in advance with the inclination direction.

An electronic apparatus according to the present disclosure is controlled by receiving a control instruction from a portable communication terminal. The electronic apparatus includes an apparatus communication unit and an apparatus controller. When a base of the portable communication terminal is inclined with respect to a predetermined reference direction of the base of the portable communication terminal, the apparatus communication unit receives the control instruction from the portable communication terminal. The control instruction is associated in advance with a direction of the inclination. The apparatus controller performs predetermined processing in accordance with the control instruction.

A method of controlling an electronic apparatus according to the present disclosure is performed by a portable communication terminal. The method includes, by using the portable communication terminal, initiating communication when the electronic apparatus comes close within a predetermined range, then activating an application program for controlling the electronic apparatus through an inclination of a base of the portable communication terminal, and notifying a user of one or more inclination directions in which the base is to be inclined with respect to a reference direction; and, when the base is inclined in one of the one or more inclination directions, transmitting, by using the portable communication terminal, a control instruction to the electronic apparatus, the control instruction being an instruction for the electronic apparatus, the control instruction being associated in advance with the inclination direction.

A method of controlling an electronic apparatus by receiving a control instruction from a portable communication terminal according to the present disclosure includes, by using the electronic apparatus, initiating communication when the portable communication terminal is brought close within a predetermined range, then transmitting an instruction to the portable communication terminal, the instruction being an instruction to activate an application program for controlling the electronic apparatus through an inclination of a base of the portable communication terminal, and notifying a user of one or more inclination directions in which the base is to be inclined with respect to a reference direction; and, when the base is inclined in one of the one or more inclination directions, receiving the control instruction from the portable communication terminal, the control instruction being associated in advance with the inclination direction, and performing predetermined processing in accordance with the control instruction.

In the present disclosure, the "electronic apparatus" is an apparatus provided with a communication function, such as a copier, a multifunction device, a multifunctional peripheral (MFP) including functions other than a copy function, a television set, a digital versatile disk (DVD) recorder, a personal computer (PC), or an electronic whiteboard.

The "portable communication terminal" is a portable terminal provided with a communication function, such as a smartphone or a tablet terminal.

The "predetermined reference direction of the base of the portable communication terminal" is, for example, the horizontal direction, the vertical direction, or the direction along a predetermined sloping surface. The expression "associated in advance with the inclination direction" means, for example, that, in the case where one of the upper, lower, right, and left sides of the base of the portable communication terminal is inclined downward with respect to the horizontal direction, the inclination directions are associated with the respective control instructions for the electronic apparatus.

Desirable aspects of the present disclosure will be further described.

(ii) The terminal communication unit may have a proximity wireless communication function of initiating communication when the electronic apparatus comes close within a predetermined range. The terminal storage unit may store an application program for controlling the electronic apparatus through the inclination of the base. When the terminal communication unit initiates communication with the electronic apparatus, the terminal controller may activate the application program.

Thus, when the portable communication terminal is just brought close within the NFC communication range of the electronic apparatus, an application for controlling the electronic apparatus is automatically activated, enabling implementation of a portable communication terminal achieving intuitive, rapid control on the electronic apparatus.

(iii) The portable communication terminal may further include a terminal notifying unit. The terminal controller may cause the terminal notifying unit to provide notification of one or more inclination directions in which the base is to be inclined with respect to the reference direction. When the inclination detecting unit detects that the base is inclined in one of the one or more inclination directions, the terminal controller may cause the terminal communication unit to transmit the control instruction to the electronic apparatus. The control instruction may be associated in advance with the inclination direction.

Thus, a user is notified of one or more inclination directions in which the base of the portable communication terminal is to be inclined. Therefore, a portable communication terminal that improves user convenience may be achieved.

The "terminal notifying unit" is, for example, a component that notifies, through a visual display, a voice, or the like, a user of one or more inclination directions in which the base of the portable communication terminal is to be inclined.

(iv) The inclination detecting unit may further detect an inclination angle of the base of the portable communication terminal with respect to the reference direction. When the inclination detecting unit detects that the base is inclined by a predetermined first angle or more with respect to the reference direction, the terminal controller may cause the terminal storage unit to store the inclination direction, and, thereafter, when the inclination detecting unit detects that the inclination of the base is returned to within a predetermined second angle smaller than the first angle, the terminal controller may cause the terminal communication unit to transmit the control instruction to the electronic apparatus. The control instruction may be associated in advance with the inclination direction.

Thus, when the state of communication with the electronic apparatus worsens due to the portable communication terminal that has been inclined, data about the inclination direction is not transmitted and is stored in the storage unit. After that, when the portable communication terminal that has been inclined is restored to the original state and the state of communication with the electronic apparatus is recovered, the data about the inclination direction which is stored in the storage unit is transmitted to the electronic apparatus. Thus, a control instruction may be stably transmitted to the electronic apparatus.

The "predetermined first angle with respect to the reference direction" is, for example, an inclination angle of the portable communication terminal at which the signal strength of communication with the electronic apparatus decreases or at which communication is cut off. An example of the first angle is about 30°.

The "predetermined second angle smaller than the first angle" is, for example, an inclination angle of the portable communication terminal at which the state of communication with the electronic apparatus improves or at which communication that has been cut off is recovered. An example of the second angle is about 0°.

(v) The electronic apparatus may be an image forming apparatus. The control instruction may encompass an instruction for image formation.

Thus, intuitive, rapid control that is exerted on an image forming apparatus by the portable communication terminal may be achieved.

(vi) The apparatus communication unit may have a proximity wireless communication function of initiating communication when the portable communication terminal is brought close within a predetermined range. When the apparatus communication unit initiates communication with the portable communication terminal, the apparatus controller may cause the apparatus communication unit to transmit an instruction to the portable communication terminal. The instruction may be an instruction to activate an application program for controlling the electronic apparatus through an inclination of the base.

Thus, when the portable communication terminal is brought close within the NFC communication range of the electronic apparatus, an instruction to activate an application for controlling the electronic apparatus is transmitted to the portable communication terminal. Accordingly, an operation for activation of the application does not need to be performed, achieving an electronic apparatus that improves user convenience.

(vii) The electronic apparatus may further include an apparatus notifying unit. The apparatus controller may cause the apparatus notifying unit to provide notification of one or more inclination directions in which the base of the portable communication terminal is to be inclined. When the base is inclined in one of the one or more inclination directions, the apparatus controller may receive the control instruction from the portable communication terminal. The control instruction may be associated in advance with the inclination direction.

Thus, a user is notified, through the apparatus notifying unit, of one or more inclination directions in which the base of the portable communication terminal is to be inclined, achieving an electronic apparatus that improves user convenience.

The "apparatus notifying unit" is, for example, a component that notifies, through a visual display, a voice, or the like, a user of one or more inclination directions in which the base of the portable communication terminal is to be inclined.

(viii) The electronic apparatus may be an image forming apparatus. The control instruction may encompass an instruction for image formation.

Thus, intuitive, rapid control exerted on an image forming apparatus by the portable communication terminal may be achieved.

The present disclosure will be further described below by using the drawings. The description below is merely exemplary in all respects, and is not to be deemed as limiting the present disclosure.

First Embodiment

On the basis of FIGS. 1 to 6, a digital-multifunction-device control system 10 that is an exemplary electronic-apparatus control system including a portable communication terminal and an electronic apparatus according to the present disclosure will be described.

Figure 2:
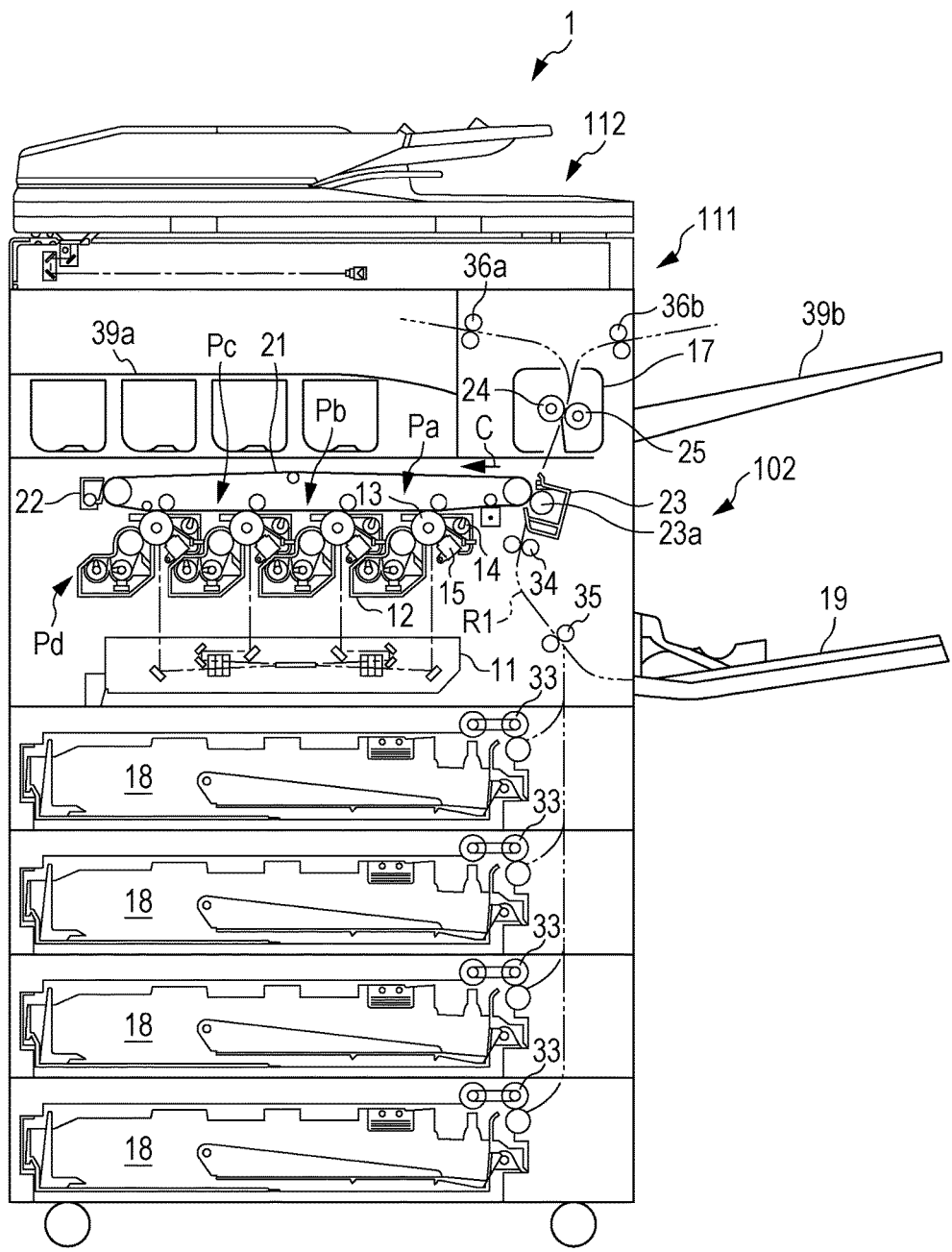
FIG. 2 is a sectional view of the mechanical configuration of a body portion of the digital multifunction device illustrated in FIG. 1.
Figure 3:
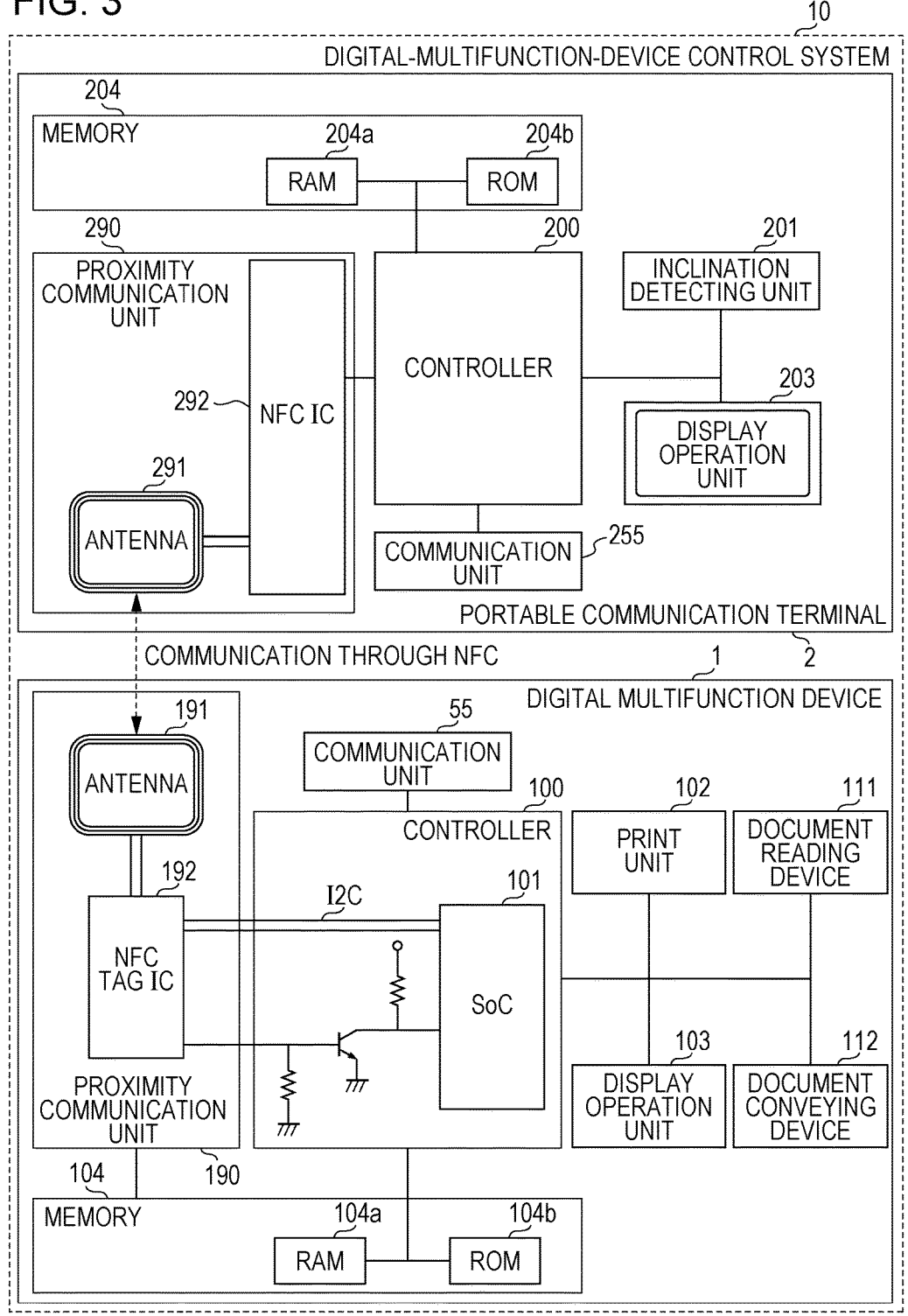
FIG. 3 is a block diagram illustrating the electrical configuration of the digital multifunction device and the portable communication terminal illustrated in FIG. 1.
Figure 4:
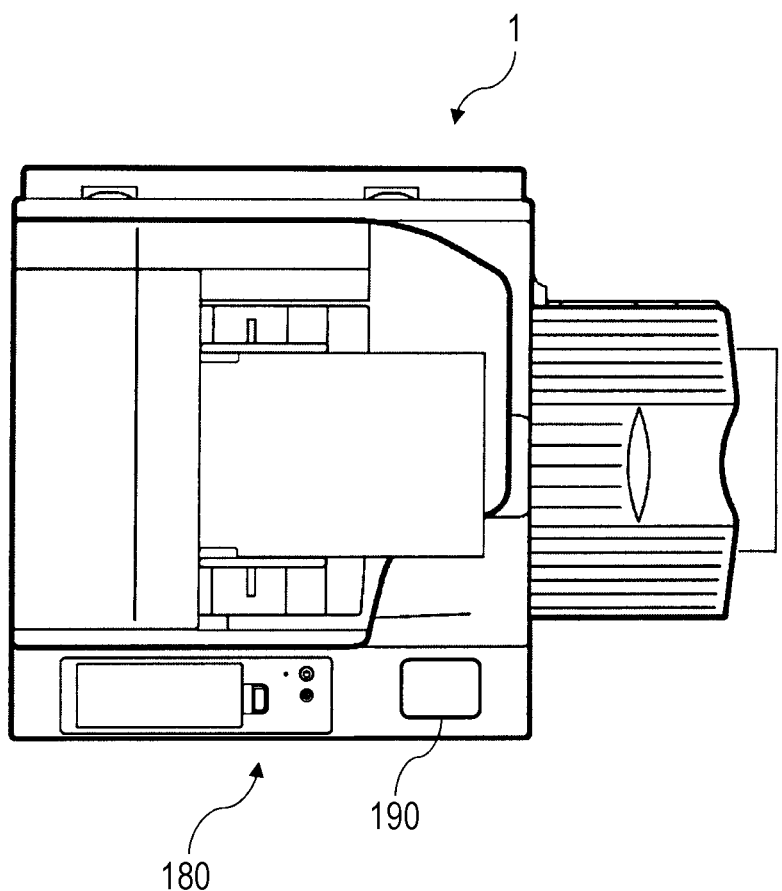
FIG. 4 is a plan view of the digital multifunction device illustrated in FIG. 1.
Figure 5:
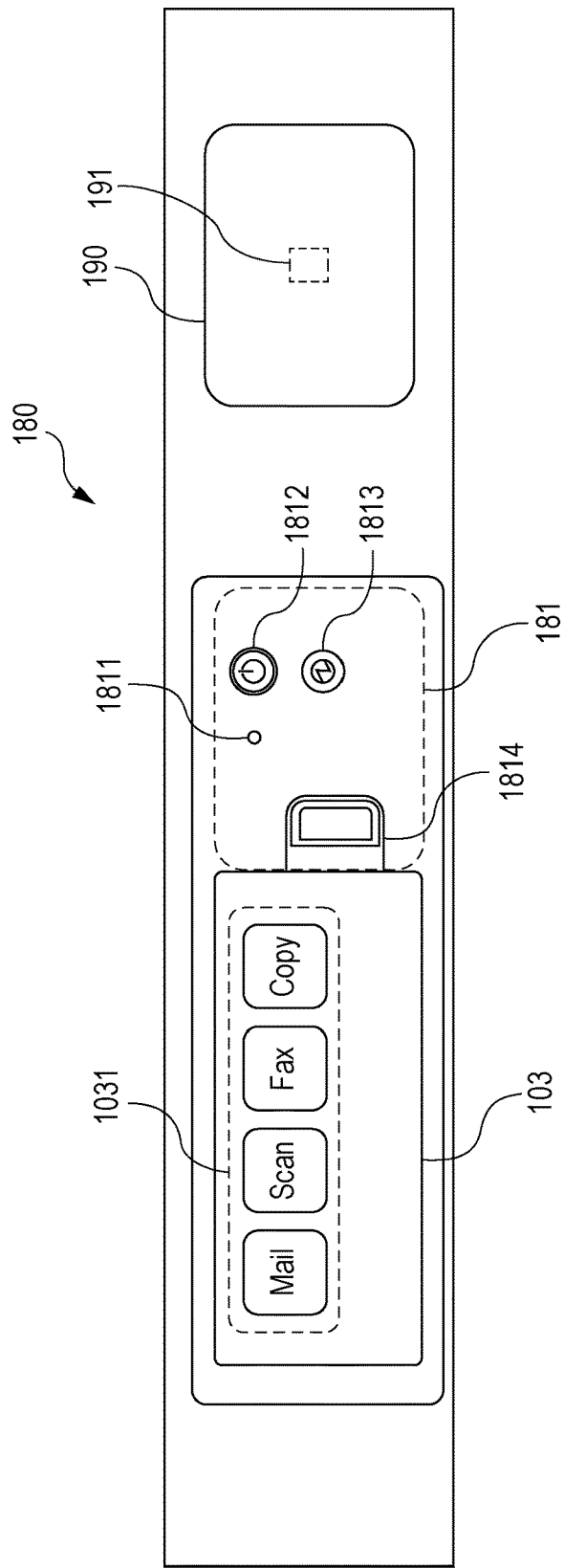
FIG. 5 is a diagram for describing an exemplary panel unit of the digital multifunction device illustrated in FIG. 1.
Figure 6:
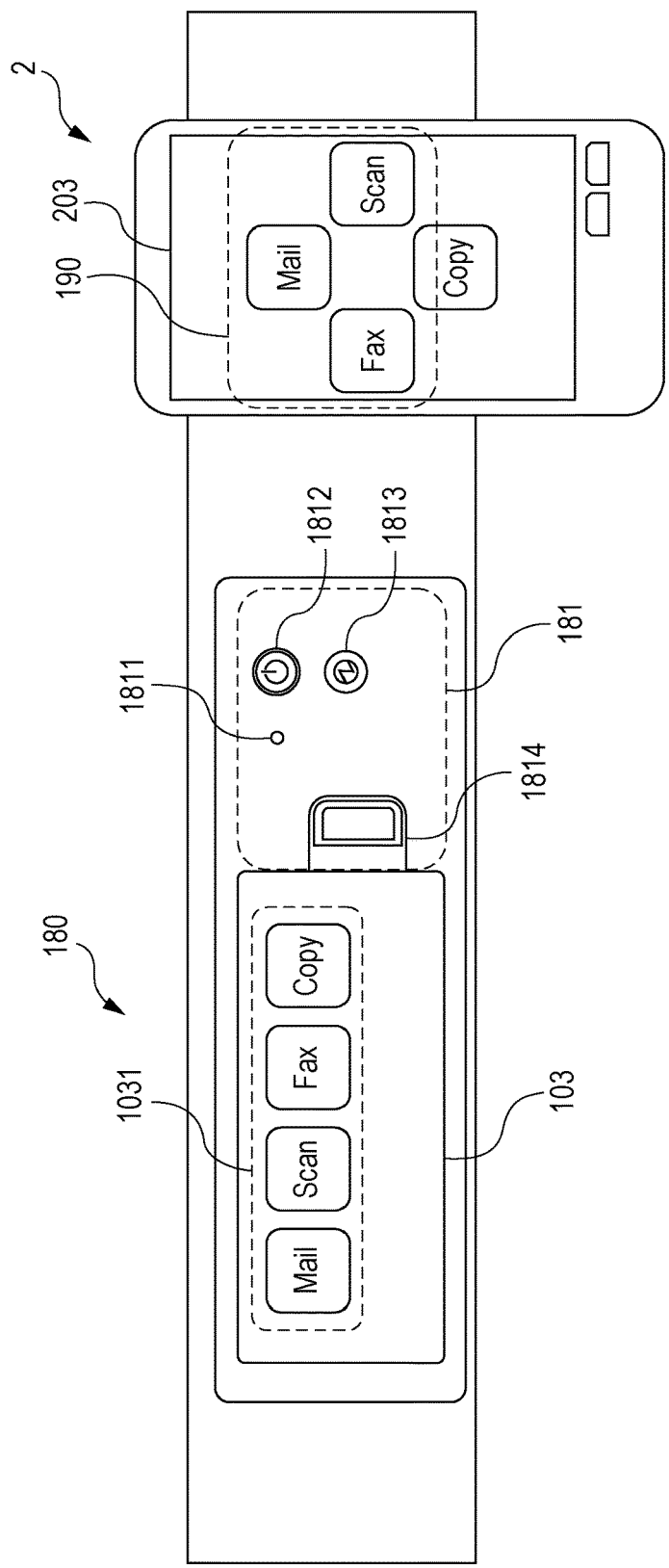
FIG. 6 is a diagram for describing an example in which the portable communication terminal is held above the panel unit illustrated in FIG. 5.

FIG. 1 is a diagram for describing the schematic configuration of the digital-multifunction-device control system 10 including a digital multifunction device 1 and a portable communication terminal 2 according to a first embodiment of the present disclosure. FIG. 2 is a sectional view of the mechanical configuration of a body part of the digital multifunction device 1 illustrated in FIG. 1. FIG. 3 is a block diagram, illustrating the electrical configuration of the digital multifunction device 1 and the portable communication terminal 2 illustrated in FIG. 1. FIG. 4 is a plan view of the digital multifunction device 1 illustrated in FIG. 1. FIG. 5 is a diagram for describing an exemplary panel unit 180 of the digital multifunction device 1 illustrated in FIG. 1. FIG. 6 is a diagram for describing an example in which the portable communication terminal 2 is held above the panel unit 180 illustrated in FIG. 5.

As illustrated in FIG. 1, the digital-multifunction-device control system 10 according to the present disclosure includes the digital multifunction device 1 and the portable communication terminal 2.

An "electronic apparatus" according to the present disclosure is implemented by the digital multifunction device 1. A "terminal communication unit" according to the present disclosure is implemented by a communication unit 255 and a proximity communication unit 290. A "terminal storage unit" according to the present disclosure is implemented by a memory 204. A "terminal notifying unit" according to the present disclosure is implemented by a display operation unit 203. An "apparatus communication unit" according to the present disclosure is implemented by a communication unit 55 and a proximity communication unit 190. An "apparatus controller" according to the present disclosure is implemented by a controller 100. An "apparatus notifying unit" according to the present disclosure is implemented by a display operation unit 103.

The digital multifunction device 1 is a device, such as a multifunction device or a multifunctional peripheral (MFP), which performs digital processing on image data and which has a copy function, a scanner function, and a facsimile function.

The digital multifunction device 1 provided with a near field communication (NFC) function communicates with the portable communication terminal 2 through NFC. In the first embodiment, NFC whose communication available range extends from about several centimeters to about several tens of centimeters is employed. A user brings the portable communication terminal 2 close within the communication available range extending from the proximity communication unit 190 provided for the digital multifunction device 1. Thus, communication with the digital multifunction device 1 is performed.

The portable communication terminal 2 is a portable information terminal that is provided with the NFC function and that has a communication function, using which various information may be received/transmitted. For example, a cellular phone such as a smartphone, or a portable terminal such as a tablet terminal may be used.

The Configuration of the Digital Multifunction Device 1

The internal configuration of the digital multifunction device 1 illustrated in FIG. 2 will be briefly described.

As illustrated in FIG. 2, the digital multifunction device 1 includes a document reading device 111 that reads a document, a document conveying device 112 that conveys a document to the reading unit, and a print unit 102 that forms an image.

The digital multifunction device 1 prints, on a print sheet, a color image using colors of black (K), cyan (C), magenta (M), and yellow (Y). Instead, a monochrome image using a monochrome color (for example, black) is printed on a print sheet. To do this, four developing devices 12, four photoreceptor drums 13, four drum cleaning devices 14, four chargers 15, and the like are provided. To form four types of toner images corresponding to the colors, each device is associated with a corresponding one of black, cyan, magenta, and yellow so that four image stations Pa, Pb, Pc, and Pd are formed.

Each of the image stations Pa, Pb, Pc, and Pd forms a toner image as follows. The drum cleaning device 14 removes and collects remaining toner that is present on the surface of the photoreceptor drum 13. After that, the charger 15 charges the surface of the photoreceptor drum 13 at a given potential uniformly. Then, an optical scanning device 11 exposes the uniformly charged surface to light, and forms an electrostatic latent image on the surface. After that, the developing device 12 develops the electrostatic latent image. Thus, a toner image of each color is formed on the surface of the corresponding one of the photoreceptor drums 13.

An intermediate transfer belt 21 moves round in the direction indicated by the arrow C. A belt cleaning device 22 removes and collects remaining toner that is present on the intermediate transfer belt 21 moving round. The toner images of the colors on the surfaces of the photoreceptor drums 13 are sequentially transferred onto the intermediate transfer belt 21 and are superimposed on top of one another so that a color toner image is formed on the intermediate transfer belt 21.

The print sheet is pulled out from one of four feeding trays 18 by using the corresponding one of pickup rollers 33, and is conveyed and fed to a second transfer device 23 through a sheet conveying path R1. Instead, the print sheet is conveyed from, a manual feeding tray 19 by using a pickup roller (not illustrated), and is fed to the second transfer device 23 through the sheet conveying path R1. Along the sheet conveying path R1, registration rollers 34 that stop the print sheet temporarily and that register the leading edge of the print sheet are disposed. In addition, conveying rollers 35 and the like that facilitate conveyance of a print sheet are disposed. After the registration rollers 34 stop the print sheet temporarily, the registration rollers 34 convey the print sheet to a nip portion between the intermediate transfer belt 21 and a transfer roller 23a in accordance with a timing at which the toner image is transferred.

The nip portion is formed between the transfer roller 23a of the second transfer device 23 and the intermediate transfer belt 21. When the print sheet passes through the nip portion, the color toner image formed on the surface of the intermediate transfer belt 21 is transferred onto the print sheet. After the print sheet passes through the nip portion, the print sheet nipped between a heating roller 24 and a pressure roller 25 of a fixing device 17 is heated and pressed. The heating and pressing operations cause the color toner image to be fixed on the print sheet.

The print sheet having passed through the fixing device 17 is discharged to a discharge tray 39a or 39b through discharge rollers 36a or 36b. The destination to which the print sheet is discharged is controlled by the controller 100 described below. A switching mechanism (not illustrated) switches the conveying path so that the print sheet is guided to one of the discharge trays 39a and 39b. The switching mechanism for the conveying path of a print sheet is known in the technical field of image forming apparatuses, and is not illustrated in detail.

On the basis of FIG. 3, the electrical configuration of the digital multifunction device 1 will be described briefly.

As illustrated in FIG. 3, the digital multifunction device 1 includes the communication unit 55, the controller 100, the print unit 102, the display operation unit 103, a memory 104, the document reading device 111, the document conveying device 112, and the proximity communication unit 190.

The digital multifunction device 1 performs jobs of scanning, printing, and copying on the basis of control instructions received from a user through the display operation unit 103, the communication unit 55, or the proximity communication unit 190.

Electrical components of the digital multifunction device 1 will be described below.

The Electrical Configuration of the Digital Multifunction Device 1

The communication unit 55 is a circuit and firmware for communication interface that receives/transmits communication data from/to an external device and that, for example, receives a control instruction for a print job or the like from an external PC or the like.

The controller 100 controls the digital multifunction device 1 integrally, and is constituted by a central processing unit (CPU), a random-access memory (RAM), a read-only memory (ROM), various interface circuits, and the like.

The controller 100 monitors and controls all loads, such as detection using sensors, motors, clutches, and fixing lamps, in order to control operations in the entirety of the digital multifunction device 1.

As illustrated in FIG. 3, the controller 100 includes a system-on-a-chip (SoC) 101 that is an integrated circuit which is implemented as a single semiconductor chip for specific use, and also includes circuits having other calculation functions.

The SoC 101 performs serial communication with an NFC tag IC 192 by using a communication standard, such as the inter-integrated circuit (I2C) or the serial peripheral interface (SPI). The SoC 101 controls the print unit 102, the document reading device 111, and the like on the basis of a print instruction received from the NFC tag IC 192 so that the print unit 102, the document reading device 111, and the like perform, processing such as printing.

Communication between the SoC 101 and the NFC tag IC 192 is not necessarily performed at a high speed, and may be performed at a low speed.

The print unit 102 prints a print image on a print sheet by using an electrophotographic system. The print unit 102 includes electrical components of the optical scanning device 11, the developing devices 12, the photoreceptor drums 13, the drum cleaning devices 14, and the chargers 15 illustrated in FIG. 2. The print unit 102 further includes electrical components of the intermediate transfer belt 21, the fixing device 17, the sheet conveying path R1, the feeding trays 18, and the discharge trays 39a and 39b.

The display operation unit 103 which includes a liquid crystal display and a touch panel is a component that displays information on the liquid crystal display, and that receives an instruction from a user through the touch panel. The controller 100 causes the display operation unit 103 to display operations and the state of the digital multifunction device 1.

The memory 104 which includes a RAM 104a and a ROM 104b is a nonvolatile storage unit, such as a hard disk device (HDD) or a flash memory, and stores various data and programs.

The RAM 104a which is a memory (random access memory) that may be accessed by the controller 100 provides a work memory in which data is temporarily stored.

The ROM 104b which is a read only memory that may be accessed by the controller 100 stores data used for program control performed by the controller 100. In the ROM 104b, for example, various types of data that are used as a base for settings for the image forming function, tag information, and the like are stored.

The RAM 104a and the ROM 104b are connected to the controller 100 through a bus. In the RAM 104a and the ROM 104b, programs are stored and loaded on a memory so that the controller 100 functions. These are an exemplary configuration, and a system including multiple CPUs and substrates may be used.

The document reading device 111 is a device such as a scanner which optically reads a document that is put on an original plate.

The document conveying device 112 is a device that conveys, to the document reading device 111, a document that is set on a given tray.

For example, the controller 100 controls the document reading device 111 and the document conveying device 112 so as to cause the document conveying device 112 to convey a document. Then, the controller 100 causes the document reading device 111 to read an image of the document, and stores the image data indicating the document image in the memory 104. Further, the controller 100 controls the print unit 102 so that an image of print data received from an external PC, the portable communication terminal 2, or the like is printed on a print sheet.

The proximity communication unit 190 is a component that communicates with the portable communication terminal 2 through NFC.

When the portable communication terminal 2 is brought within the communication available range, the proximity communication unit 190 receives a response from the portable communication terminal 2, and recognizes that the portable communication terminal 2 has been brought within the communication available range.

The proximity communication unit 190 includes an antenna 191 and the NFC tag IC 192.

The proximity communication unit 190 is disposed at a predetermined position (see FIG. 1) of the digital multifunction device 1, and the antenna 191 serves as a medium for performing NFC communication with the portable communication terminal 2 that has been brought close.

The NFC tag IC 192 is an IC for communicating with the portable communication terminal 2 through NFC.

As the NFC tag IC 192, a tag IC, such as an active tag that is a wireless tag which includes a battery and which is capable of transmitting radio waves, or a dynamic tag that receives radio waves from the portable communication terminal 2 and that operates by using the radio waves as electromotive force, may be used.

Even in long-distance wireless communication, for example, the communication range may be measured by using communication intensity or the like, and communication with the portable communication terminal 2 may be initiated only when the portable communication terminal 2 is present within a predetermined range.

Alternatively, a given switch or the like of the portable communication terminal 2 may be turned on so that communication with the portable communication terminal 2 is initiated.

The overview of the configuration of the digital multifunction device 1 is described above.

The Electrical Configuration of the Portable Communication Terminal 2

The electrical configuration of the portable communication terminal 2 will be described.

As illustrated in FIG. 3, the portable communication terminal 2 according to the present disclosure includes a controller 200, an inclination detecting unit 201, the display operation unit 203, the memory 204, the communication unit 255, and the proximity communication unit 290.

Electrical components of the portable communication terminal 2 will be described below. The display operation unit 203 and the communication unit 255 have similar configurations to those of the display operation unit 103 and the communication unit 55 of the digital multifunction device 1, respectively, and will not be described.

The controller 200 is a component that controls the portable communication terminal 2 integrally, and is constituted by a CPU, a RAM, a ROM, various interface circuits, and the like.

The inclination detecting unit 201 is a component that detects an inclination of the body of the portable communication terminal 2.

As a method of detecting an inclination, for example, an acceleration sensor is used to measure the magnitude of the gravitational acceleration of the Earth on the portable communication terminal 2. Thus, the inclination direction and the inclination angle of the portable communication terminal 2 may be obtained.

Alternatively, a gyro sensor is used to detect an angular rate produced on the portable communication terminal 2. Thus, the inclination direction, the inclination angle, the inclination rate, and the like of the portable communication terminal 2 may be obtained.

The memory 204 has a similar configuration to the configuration of the memory 104. In a ROM 204*b*, for example, application program data for control through NFC on the digital multifunction device 1 is stored.

In the application program, various control instructions corresponding to inclination directions with respect to a predetermined reference direction of the body of the portable communication terminal 2 are registered in advance.

The proximity communication unit 290 is a component that performs communication with the digital multifunction device 1 through NFC.

The proximity communication unit 290 includes an antenna 291 and an NFC IC 292.

The antenna 291 serves as a medium for NFC communication with the digital multifunction device 1.

The NFC IC 292 is an IC that performs communication with the digital multifunction device 1 through NFC.

The arrangement of the proximity communication unit 190 will be described.

As illustrated in FIGS. 4 and 5, the digital multifunction device 1 is provided with the panel unit 180 in a portion of the top surface.

As illustrated in FIG. 5, the panel unit 180 includes the display operation unit 103, a physical operation unit 181, and the proximity communication unit 190.

On the display operation unit 103, operation icons 1031 and the like for operating the digital multifunction device 1 are displayed. A user may touch an operation icon 1031 so as to operate the digital multifunction device 1.

The physical operation unit 181 is a component that performs an operation by pressing a physical key, and includes an indicator lamp 1811, a power key 1812, a power saving key 1813, and a home key 1814.

The home key 1814 is a key for returning the display screen on the display operation unit 103 to the home screen on which an operation mode is selected.

The proximity communication unit 190 includes an antenna 191. In FIG. 5, the antenna 191 is disposed near the center of the proximity communication unit 190.

As illustrated in FIG. 6, a user holds the portable communication terminal 2 above the proximity communication unit 190 horizontally so that NFC communication between the digital multifunction device 1 and the portable communication terminal 2 is initiated. As long as within the NFC communication range, the portable communication terminal 2 may be separate from the proximity communication unit 190 over a certain distance (for example, about several centimeters to several tens of centimeters).

In the case of a television set, an electronic whiteboard, or the like, the portable communication terminal 2 is held so as to be parallel to the proximity communication unit 190, for example, disposed on the display vertically. Thus, NFC communication may be initiated.

In this case, the vertical direction serves as the reference for the inclination angle of the portable communication terminal 2.

When the proximity communication unit 190 is inclined obliquely, the portable communication terminal 2 is held so as to be parallel to the proximity communication unit 190. Thus, NFC communication may be initiated.

In this case, the parallel direction with respect to the proximity communication unit 190 serves as the reference of the inclination angle of the portable communication terminal 2.

An Overview of Control of the Digital Multifunction Device 1 According to the First Embodiment of the Present Disclosure On the basis of FIGS. 7 to 10B, an overview of control of the digital multifunction device 1 according to the first embodiment of the present disclosure will be described.

Figure 7:
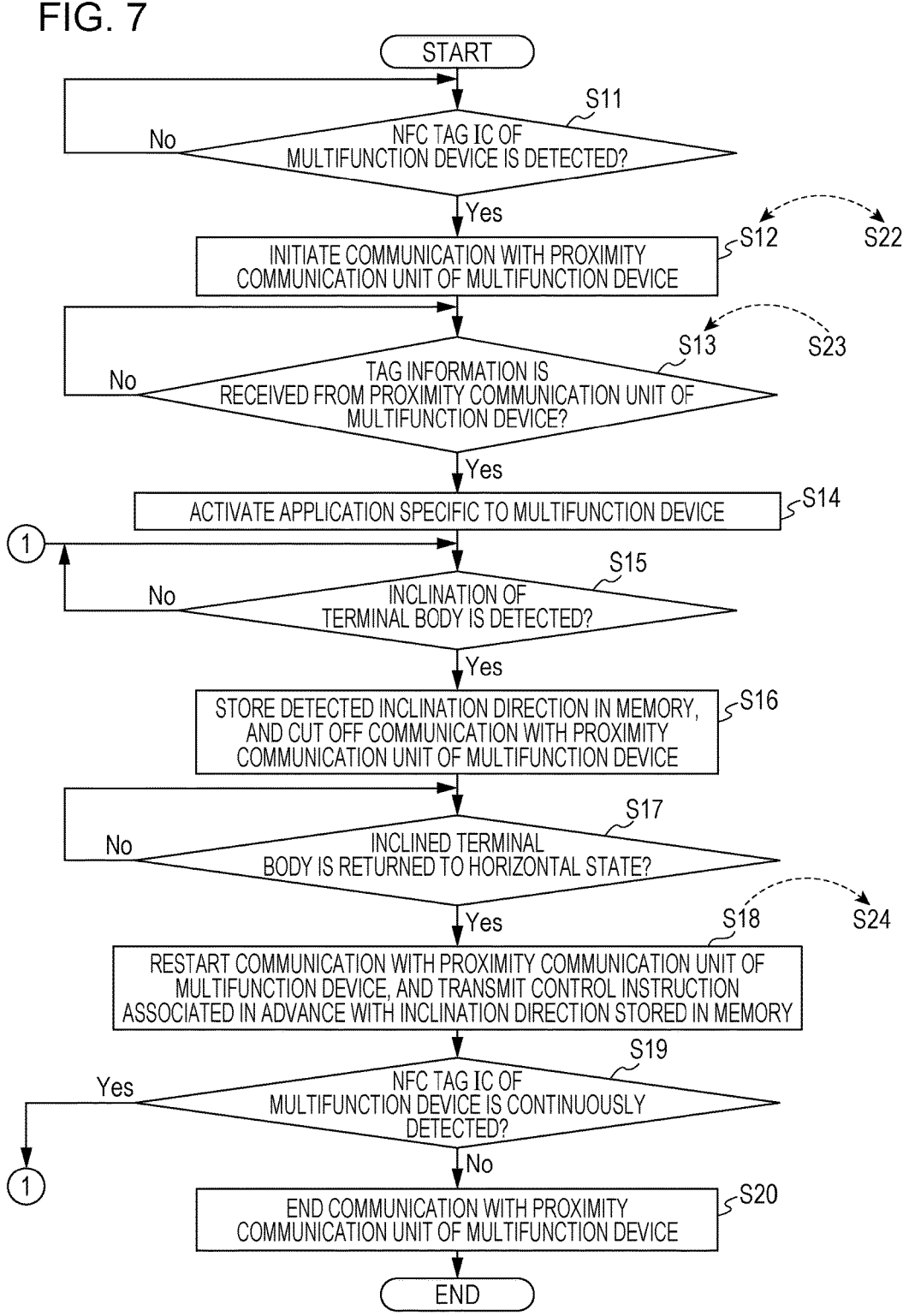
FIG. 7 is a flowchart indicating an overview of a process performed by the portable communication terminal illustrated in FIG. 1.
Figure 8:
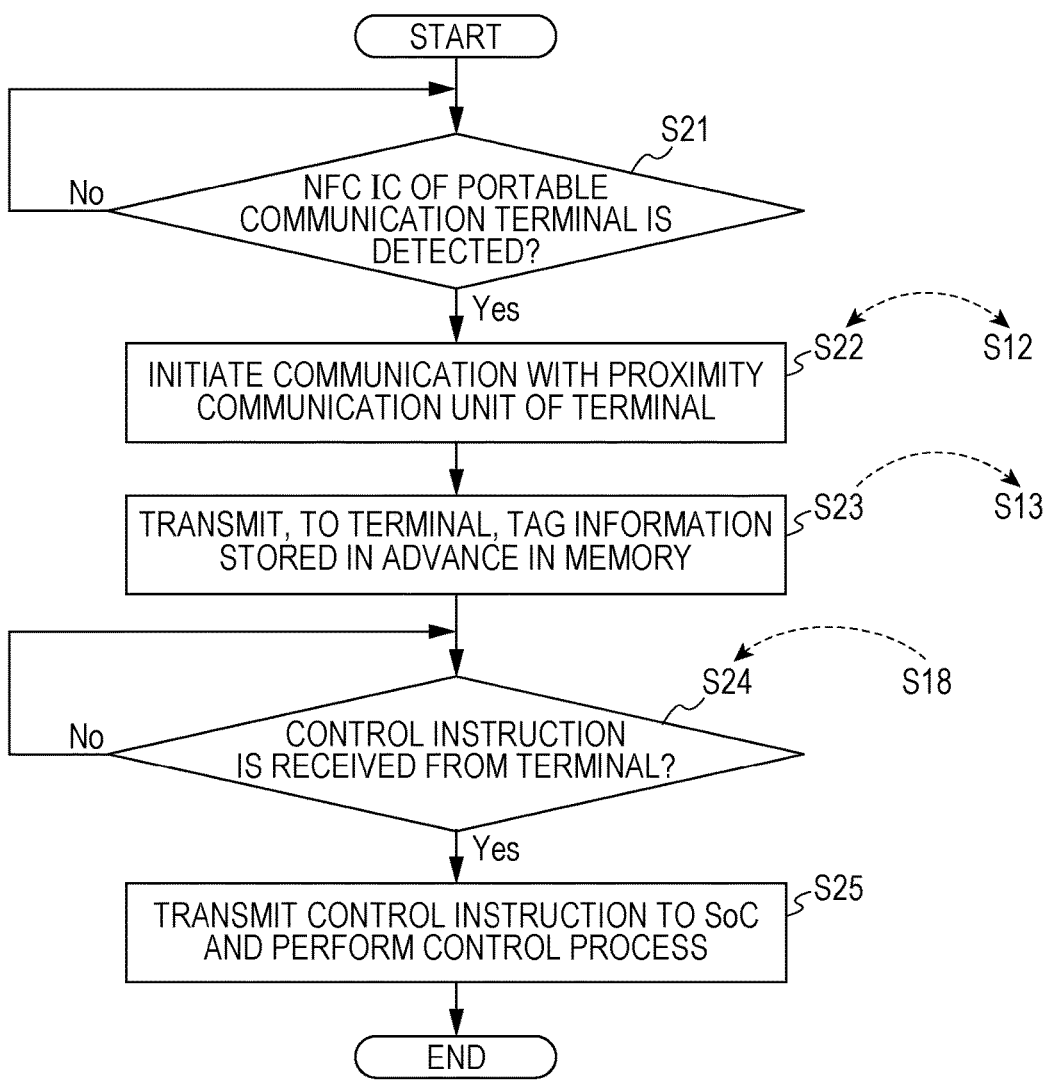
FIG. 8 is a flowchart indicating an overview of a process performed by the digital multifunction device illustrated in FIG. 1.
Figure 9:
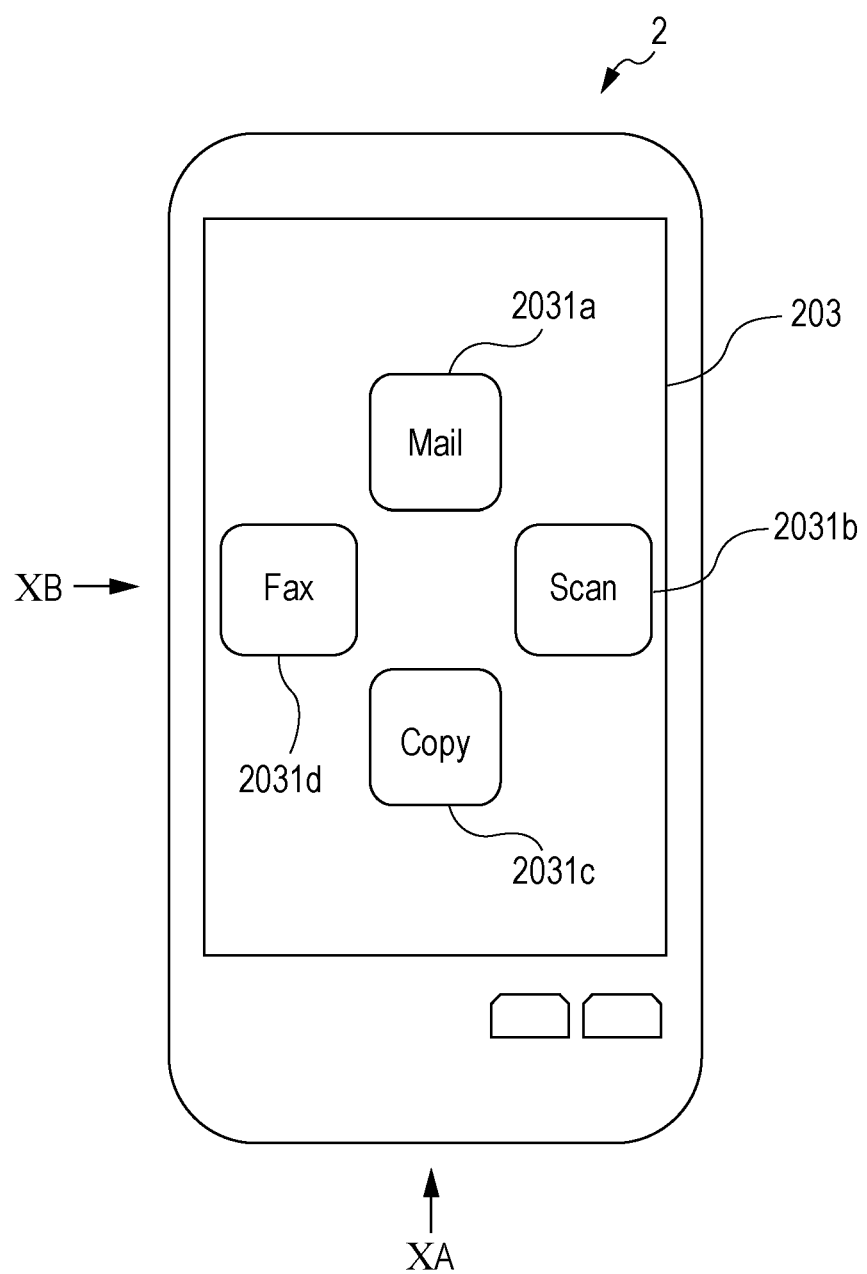
FIG. 9 is a diagram for describing an exemplary display operation unit of the portable communication terminal illustrated in FIG. 1.
Figure 10A:
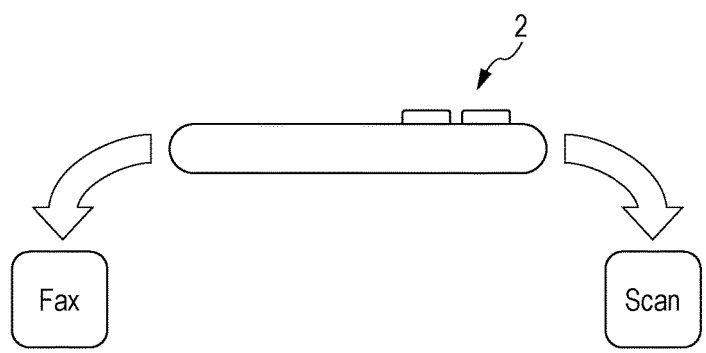
FIG. 10A is a view that is used to describe exemplary inclinations of the portable communication terminal illustrated in FIG. 1, and that is viewed in the direction indicated by the XA arrow in FIG. 9.
Figure 10B:
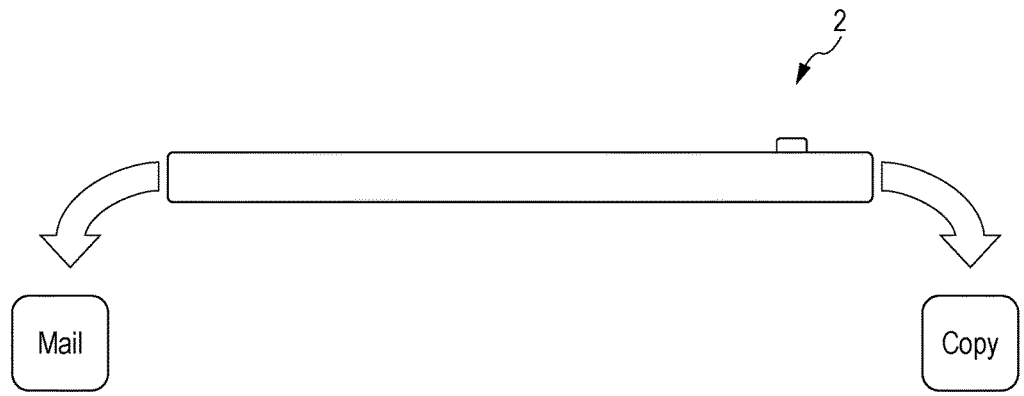
FIG. 10B is a view that is used to describe exemplary inclinations of the portable communication terminal illustrated in FIG. 1, and that is viewed in the direction indicated by the XB arrow in FIG. 9.

FIG. 7 is a flowchart indicating an overview of a process performed by the portable communication terminal 2 illustrated in FIG. 1. FIG. 8 is a flowchart indicating an overview of a process performed by the digital multifunction device 1 illustrated in FIG. 1. FIG. 9 is a diagram for describing an exemplary display operation unit 203 of the portable communication terminal 2 illustrated in FIG. 1. FIGS. 10A and 10B are diagrams for describing exemplary inclinations of the portable communication terminal 2 illustrated in FIG. 1. FIG. 10A describes exemplary inclinations viewed in the direction indicated by the XA arrow in FIG. 9. FIG. 10B describes exemplary inclinations viewed in the direction indicated by the XB arrow in FIG. 9.

The dashed-line arrows in FIG. 7 indicate related steps in the flowchart in FIG. 8.

For example, the process in step S12 in FIG. 7 is mutually related to the process in step S22 in FIG. 8. The process in step S13 in FIG. 7 is performed in response to the process in step S23 in FIG. 8. The process in step S24 in FIG. 8 is performed in response to the process in step S18 in FIG. 7.

The Process Flow of the Portable Communication Terminal 2 According to the Present Disclosure On the basis of FIG. 7, the process flow of the portable communication terminal 2 according to the present disclosure will be described.

In step S11 in FIG. 7, the controller 200 of the portable communication terminal 2 determines whether or not the proximity communication unit 290 has detected the NFC tag IC 192 of the digital multifunction device 1 (step S11).

If the proximity communication unit 290 has detected the NFC tag IC 192 of the digital multifunction device 1 (in the case of Yes in the determination in step S11), in step S12, the controller 200 causes the proximity communication unit 290 to initiate communication with the proximity communication unit 190 of the digital multifunction device 1 (step S12).

In contrast, if the proximity communication unit 290 has not detected the NFC tag IC 192 of the digital multifunction device 1 (in the case of No in the determination in step S11), the controller 200 repeatedly performs the determination in step S11 (step S11).

In step S13, the controller 200 determines whether or not the proximity communication unit 290 has received tag information of the NFC tag IC 192 from the proximity communication unit 190 of the digital multifunction device 1 (step S13).

If the proximity communication unit 290 has received tag information of the NFC tag IC 192 from the proximity communication unit 190 of the digital multifunction device 1 (in the case of Yes in the determination in step 313), in step S14, the controller 200 activates an application specific to the digital multifunction device 1, on the basis of the received tag information (step 314).

In the tag information, data is written in advance so that, when the portable communication terminal 2 receives the tag information, an application corresponding to the digital multifunction device 1 is automatically activated.

Thus, the portable communication terminal 2 is just brought near a different type of electronic apparatus, such as a multifunction device or a television set. This causes the corresponding application to be activated automatically, improving user convenience.

In contrast, if the proximity communication unit 290 has not received tag information of the MFC tag IC 192 from the proximity communication unit 190 of the digital multifunction device 1 (in the case of No in the determination in step S13), the controller 200 repeatedly performs the determination in step S13 (step S13).

In step S15, the controller 200 determines whether or not the inclination detecting unit 201 has detected an inclination of the body of the portable communication terminal 2 (step S15).

If an inclination of the body of the portable communication terminal 2 has been detected (in the case of Yes in the determination in step S15), in step S16, the controller 200 stores the detected inclination direction in the memory 204, and the communication with the proximity communication unit 190 of the digital multifunction device 1 is temporarily cut off (step S16).

In contrast, if an inclination of the body of the portable communication terminal 2 has not been detected (in the case of No in the determination in step S15), the controller 200 repeatedly performs the determination in step S15 (step S15).

In step S17, the controller 200 determines whether or not the body of the portable communication terminal 2, which had been inclined, has been returned to the horizontal state (step S17).

If the body of the portable communication terminal 2, which had been inclined, has been returned to the horizontal state (in the case of Yes in the determination in step S17), in step S18, the controller 200 causes the proximity communication unit 290 to restart communication with the proximity communication unit 190 of the digital multifunction device 1, and causes the proximity communication unit 290 to transmit a control instruction associated in advance with the inclination direction which is stored in the memory 204 (step S18).

In contrast, if the body of the portable communication terminal 2, which had been inclined, has not been returned to the horizontal state (in the case of No in the determination in step S17), the controller 200 repeatedly performs the determination in step S17 (step S17).

In step S19, the controller 200 determines whether or not the proximity communication unit 290 has continuously detected the NFC tag IC 192 of the digital multifunction device 1 (step S19).

If the proximity communication unit 290 has continuously detected the NFC tag IC 192 of the digital multifunction device 1 (in the case of Yes in the determination in step S19), the controller 200 causes the process to return to the determination in step S15 (step S15).

In contrast, if the proximity communication unit 290 has not continuously detected the NFC tag IC 192 of the digital multifunction device 1 (in the case of No in the determination in step S19), the controller 200 ends the communication with the proximity communication unit 190 of the digital multifunction device 1 (step S20).

In step S17, even when the body of the portable communication terminal 2, which had been inclined, has not been returned to the horizontal state, if the proximity communication unit 290 has not continuously detected the NFC tag IC 192 of the digital multifunction device 1, the controller 200 may end the communication with the proximity communication unit 190 of the digital multifunction device 1.

After the communication is ended in step S20, the controller 200 may reset the inclination direction which is stored in the memory 204.

Thus, when a user inclines the body of the portable communication terminal 2 in an erroneous direction unintentionally, the portable communication terminal 2 is removed from the communication available range of the proximity communication unit 190 of the digital multifunction device 1. This causes the communication with the proximity communication unit 190 to end, and the erroneous control instruction may be canceled.

The Process Flow of the Digital Multifunction Device 1 According to the Present Disclosure On the basis of FIG. 8, the process flow of the digital multifunction device 1 according to the present disclosure will be described.

In step S21 in FIG. 8, the controller 100 of the digital multifunction device 1 determines whether or not the NFC tag IC 192 of the proximity communication unit 190 has detected the NFC IC 292 of the portable communication terminal 2 (step S21).

If the NFC tag IC 192 has detected the NFC IC 292 (in the case of Yes in the determination in step S21), in step S22, the controller 100 causes the proximity communication unit 190 to initiate communication with the proximity communication unit 290 of the portable communication terminal 2 (step S22).

In contrast, if the NFC tag IC 192 has not detected the NFC IC 292 (in the case of No in the determination in step S21), the controller 100 repeatedly performs the determination in step S21 (step S21).

In step S23, the controller 100 causes the tag information stored in advance in the memory 104 to be transmitted to the portable communication terminal 2 (step S23).

In step S24, the controller 100 determines whether or not the proximity communication unit 190 has received a control instruction from the portable communication terminal 2 (step S24).

If the proximity communication unit 190 has received a control instruction from the portable communication terminal 2 (in the case of Yes in the determination in step S24), in step S25, the controller 100 transmits the received control instruction to the SoC 101 and performs the control process (step S25).

Specifically, after a control instruction has been received from the portable communication terminal 2, the NFC tag IC 192 writes the received control instruction in the memory 104, and transmits an interrupt request to the SoC 101.

The SoC 101 that has received the interrupt request transmits, to the NFC tag IC 192, a transmit request to transmit the control instruction. The NFC tag IC 192 that has received the transmit request from the SoC 101 reads the control instruction stored in the memory 104, and transmits the control instruction to the SoC 101.

When the SoC 101 receives the control instruction from the NFC tag IC 192, the SoC 101 performs a control process corresponding to the received control instruction.

After that, the controller 100 ends the control process performed on the digital multifunction device 1.

In contrast, in step S24, if the proximity communication unit 190 has not received a control instruction from the portable communication terminal 2 (in the case of No in the determination in step S24), the controller 100 repeatedly performs the determination in step S24 (step S24).

On the basis of FIGS. 9 to 10B, exemplary inclinations of the portable communication terminal 2 according to the present disclosure will be described.

When the application specific to the digital multifunction device 1 is activated, as illustrated in FIG. 9, a screen for controlling the digital multifunction device 1 is displayed on the display operation unit 203 of the portable communication terminal 2.

In the example in FIG. 9, four icons (that is, a "Mail" icon 2031a, a "Scan" icon 2031b, a "Copy" icon 2031c, and a "Fax" icon 2031d) are displayed on the upper side, the right side, the lower side, and the left side of the display operation unit 203, respectively.

A message indicating that the portable communication terminal 2 is to be inclined in any of the upper, lower, right, and left directions may be displayed in an empty space of the display operation unit 203.

Alternatively, the message may be given by voice.

When the portable communication terminal 2 is not oriented in the predetermined reference direction, a message may be given so that the portable communication terminal 2 is to be oriented in the reference direction.

When the portable communication terminal 2 is not inclined in one of the upper, lower, right, and left directions, a message may be given so that the portable communication terminal 2 is to be inclined in a correct direction.

Thus, notification of a message improves convenience for a visually or hearing impaired user.

While a user holds the portable communication terminal 2 above the proximity communication unit 190, the user inclines the portable communication terminal 2 from the reference direction (in the example in FIG. 6, the horizontal direction).

As illustrated in FIG. 10A, when a user is to perform the scan function, the user inclines the right side of the portable communication terminal 2 downward. When the user is to perform the fax function, the user inclines the left side of the portable communication terminal 2 downward.

As illustrated in FIG. 10B, when the user is to perform the copy function, the user inclines the near side of the portable communication terminal 2 downward. When the user is to perform the mail function, the user inclines the far side of the portable communication terminal 2 downward.

At that time, when an inclination of the portable communication terminal 2 is detected, the NFC communication is temporarily cut off. When the portable communication terminal 2, which has been inclined, is returned to the horizontal state, the NFC communication is restarted, and a control instruction is transmitted to the digital multifunction device 1.

Thus, when an inclination of the portable communication terminal 2 causes the state of communication with the digital multifunction device 1 to worsen, data about the inclination direction is not transmitted and is stored in the memory 204. After the portable communication terminal 2 that has been inclined is restored to the original state, when the state of communication with the digital multifunction device 1 is recovered, the data about the inclination direction which is stored in the memory 204 is transmitted to the digital multifunction device 1, achieving stable transmission of a control instruction to the digital multifunction device 1.

Thus, a user just holds the portable communication terminal 2 above the proximity communication unit 190, and inclines the portable communication terminal 2 in a given direction. This enables intuitive, rapid control on the digital multifunction device 1, improving user convenience.

Second Embodiment

On the basis of FIG. 11, the digital-multifunction-device control system 10 serving as an exemplary electronic-apparatus control system according to a second embodiment of the present disclosure will be described.

Figure 11:
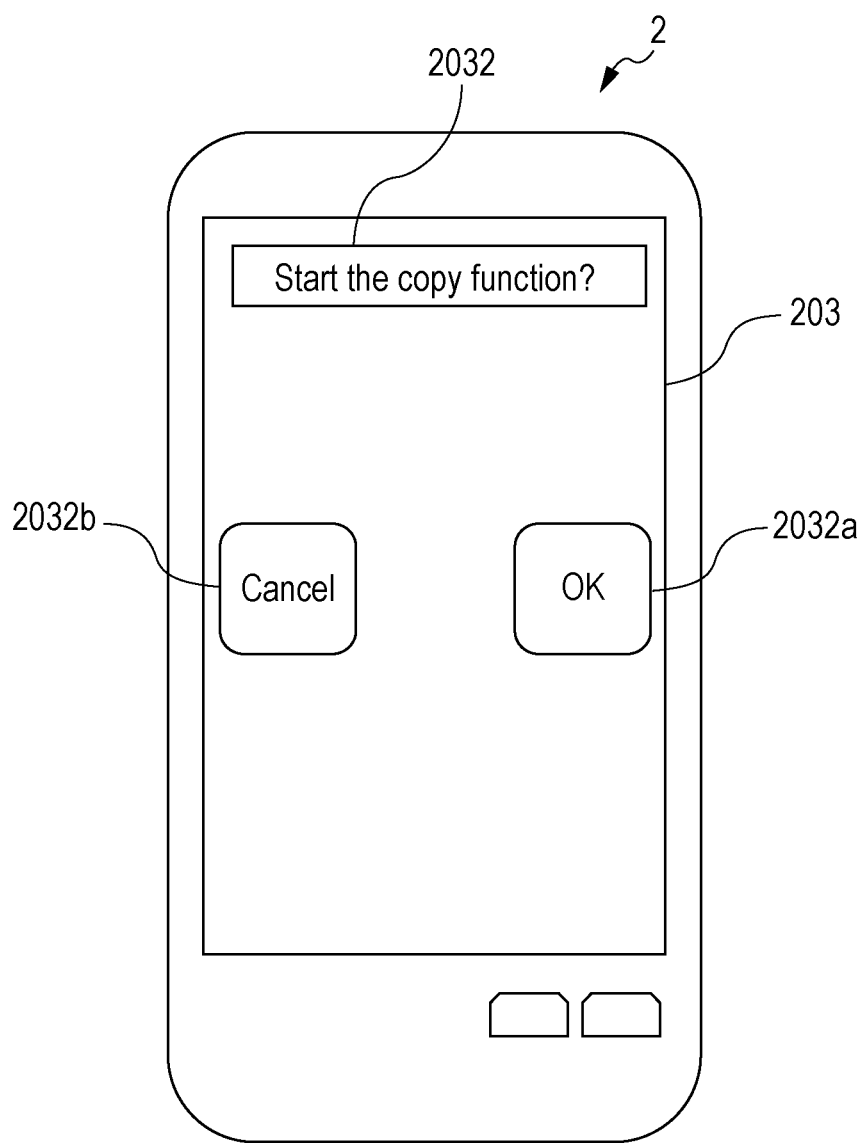
FIG. 11 is a diagram for describing an exemplary display operation unit of a portable communication terminal according to a second embodiment of the present disclosure.

FIG. 11 is a diagram for describing an exemplary display operation unit 203 of the portable communication terminal 2 according to the second embodiment of the present disclosure.

In the second embodiment, a user inclines the portable communication terminal 2 in one of the upper, lower, right, and left directions so as to select one of the mail, copy, fax, and scan functions. Then, a screen to prompt the user to make a confirmation is further displayed.

FIG. 11 illustrates an exemplary screen displayed on the display operation unit 203 after a user inclines the lower side of the portable communication terminal 2 downward so as to select the copy function in FIG. 9.

As illustrated in FIG. 11, a message 2032 of "Start the copy function?" and two icons, an "OK" icon 2032a and a "Cancel" icon 2032b, that correspond to two types of operation, "OK" and "Cancel", respectively, are displayed on the display operation unit 203.

In the state illustrated in FIG. 11, when the user inclines the right side of the portable communication terminal 2 downward so as to select "OK", an instruction to perform the copy function is transmitted to the digital multifunction device 1.

When the user inclines the left side of the portable communication terminal 2 downward so as to select "Cancel", an instruction to cancel the state in which the copy function is selected is transmitted to the digital multifunction device 1.

After that, the screen on the display operation unit 203 is returned to the selection screen illustrated in FIG. 9.

Thus, after a specific operation is selected, a screen to prompt a user to make a confirmation is further displayed so that the user select one of "OK" and "Cancel". Thus, an erroneous operation produced by inclining the portable communication terminal 2 in an unintentional direction may be avoided.

The confirmation operation is performed also by inclining the portable communication terminal 2. Therefore, intuitive, rapid control on the digital multifunction device 1 is achieved, improving user convenience.

After the copy function is started, a "stop" icon may be displayed on the display operation unit 203 during execution of the copy function. By inclining the portable communication terminal 2 in the "stop"-icon direction, an instruction to stop execution of the copy function may be transmitted to the digital multifunction device 1.

Thus, even after start of the copy function, a user may incline the portable communication terminal 2 so that execution of the copy function is stopped. Therefore, intuitive, rapid control on the digital multifunction device 1 may be performed, improving user convenience.

Third Embodiment

On the basis of FIGS. 12 to 14, the digital-multifunction-device control system 10 serving as an exemplary electronic-apparatus control system according to a third embodiment of the present disclosure will be described.

Figure 12:
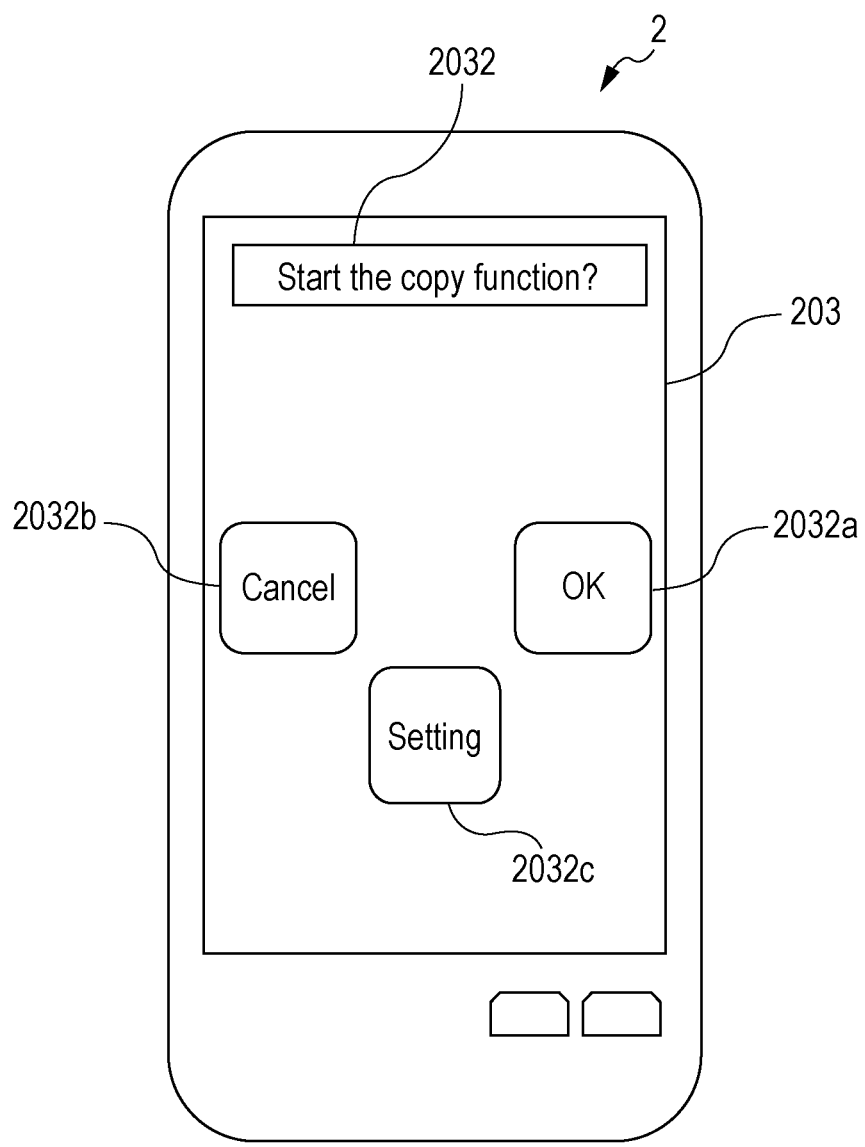
FIG. 12 is a diagram for describing an exemplary display operation unit of a portable communication terminal according to a third embodiment of the present disclosure.
Figure 13:
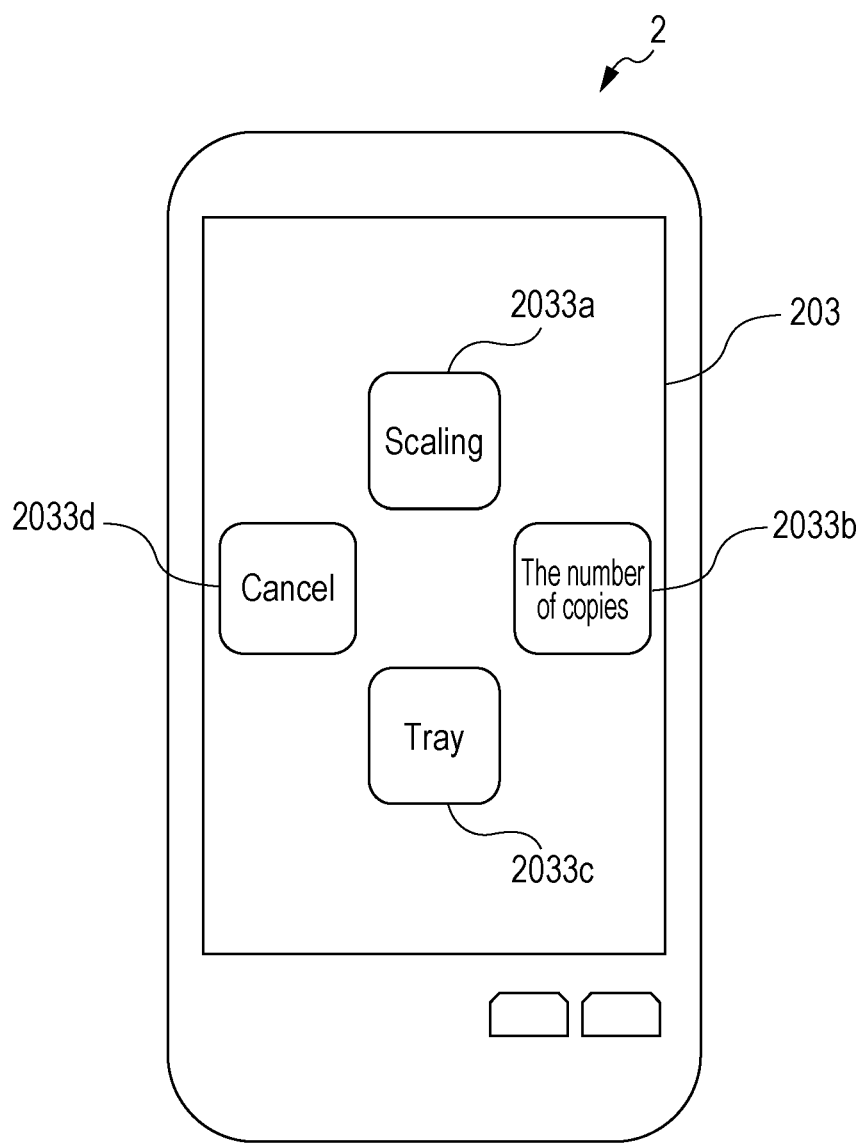
FIG. 13 is a diagram for describing an exemplary display operation unit of the portable communication terminal according to the third embodiment of the present disclosure.
Figure 14:
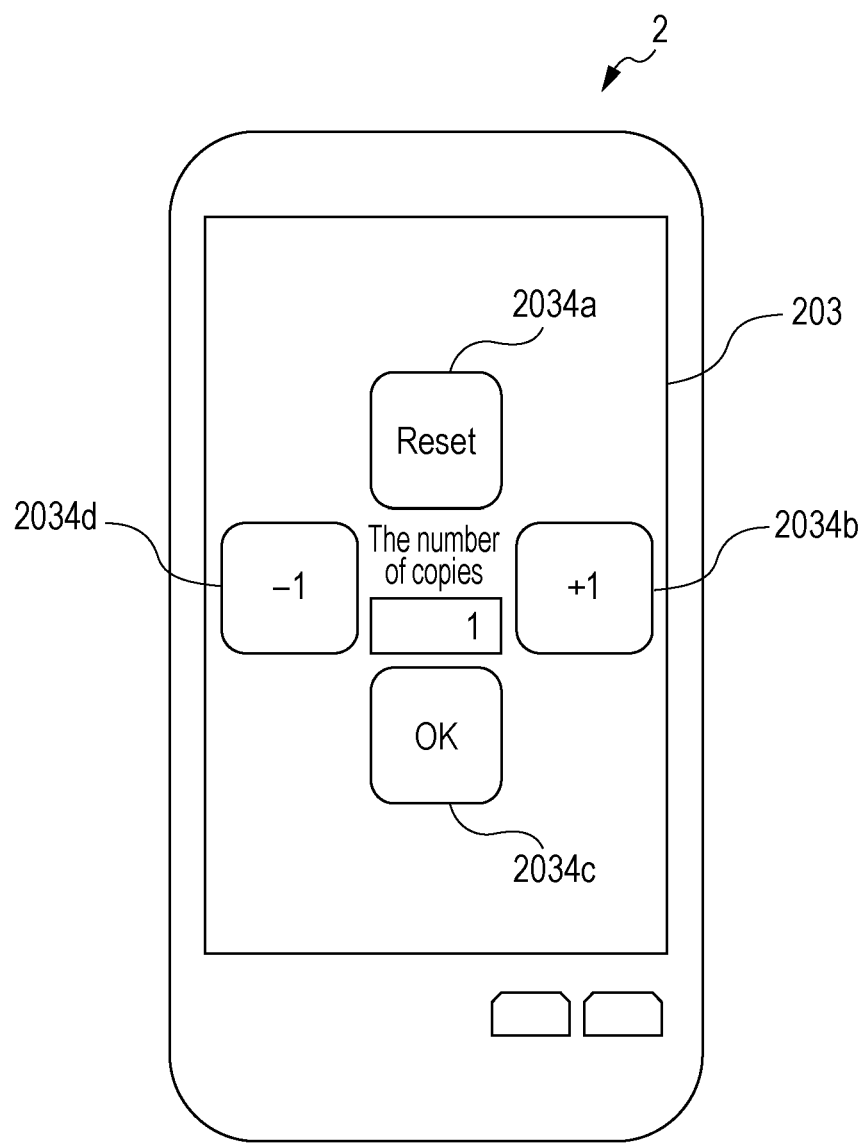
FIG. 14 is a diagram for describing an exemplary display operation unit of the portable communication terminal according to the third embodiment of the present disclosure.

FIGS. 12 to 14 are diagrams for describing an exemplary display operation unit 203 of the portable communication terminal 2 according to the third embodiment of the present disclosure.

As illustrated in FIG. 12, a "Setting" icon 2032c is additionally displayed on the display operation unit 203 so that another operation may be further performed.

FIG. 13 illustrates the display operation unit 203 obtained when a setting screen is displayed by inclining the lower side of the portable communication terminal 2 downward in FIG. 12.

As illustrated in FIG. 13, a "Scaling" icon 2033a, a "The number of copies" icon 2033b, a "Tray" icon 2033c, and a "Cancel" icon 2033d are displayed on the display operation unit 203.

FIG. 14 illustrates the display operation unit 203 obtained when the setting screen for the number of copies is displayed by inclining the right side of the portable communication terminal 2 downward in FIG. 13.

As illustrated in FIG. 14, a "Reset" icon 2034a, a "+1" icon 2034b, an "OK" icon 2034c, and a "−1" icon 2034d are displayed on the display operation unit 203.

A user may incline the right or left side of the portable communication terminal 2 downward so that the number of copies is increased or decreased.

At that time, by inclining the portable communication terminal 2 once, the number of copies may be changed by one. Alternatively, when the portable communication terminal 2 is inclined for a predetermined time or longer (for example, three seconds or more), the number of copies may be continuously increased/decreased.

In addition to a period during which the portable communication terminal 2 is inclined, different control may be assigned depending on the inclination angle or the inclination rate of the portable communication terminal 2.

For example, the more the inclination angle or the inclination rate of the portable communication terminal 2 is, the higher the rate at which the number of copies is increased/decreased is.

Thus, different control is assigned depending on the period of inclination, the inclination angle, or the inclination rate of the portable communication terminal 2. Thus, intuitive, rapid control on the digital multifunction device 1 is achieved, improving user convenience.

Fourth Embodiment

On the basis of FIG. 15, the digital-multifunction-device control system 10 serving as an exemplary electronic-apparatus control system according to a fourth embodiment of the present disclosure will be described.

Figure 15:
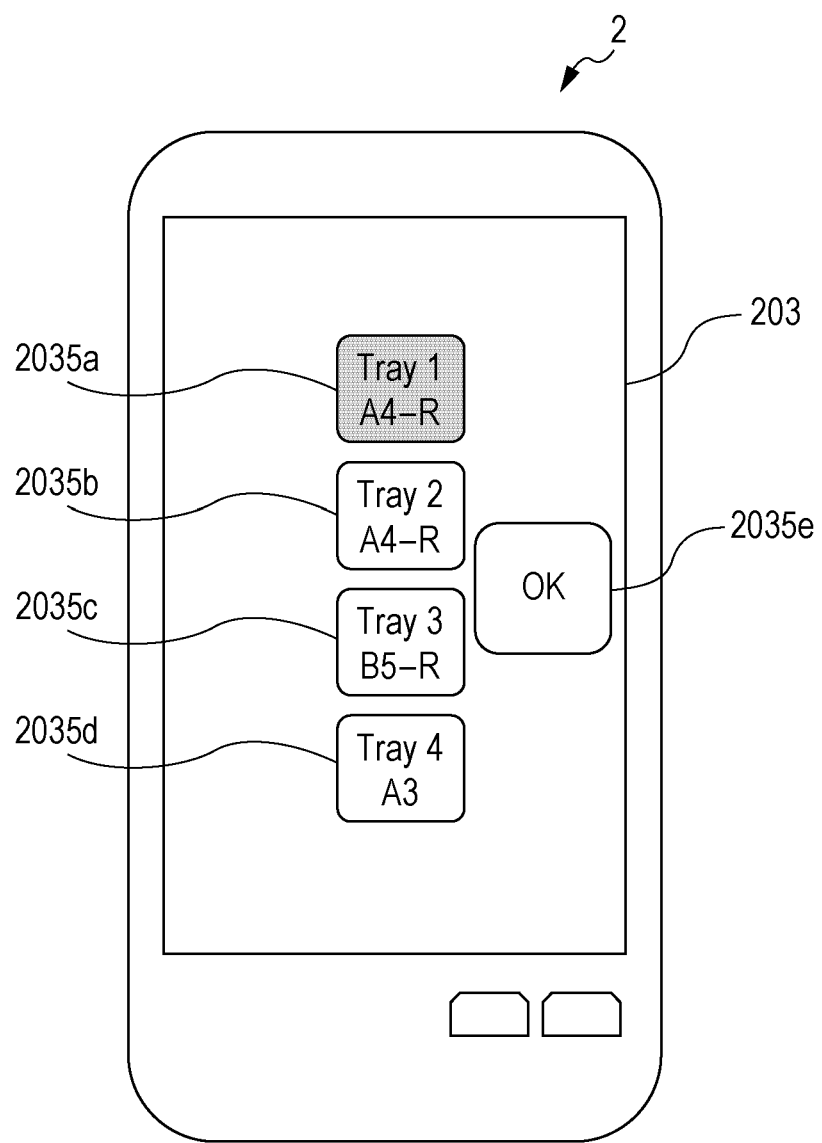
FIG. 15 is a diagram for describing an exemplary display operation unit of a portable communication terminal according to a fourth embodiment of the present disclosure.

FIG. 15 is a diagram for describing an exemplary display operation unit 203 of the portable communication terminal 2 according to the fourth embodiment of the present disclosure.

As illustrated in FIG. 15, a "Tray 1 A4-R" icon 2035a, a "Tray 2 A4-R" icon 2035b, a "Tray 3 B5-R" icon 2035c, a "Tray 4 A3" icon 2035a, and an "OK" icon 2035e are displayed on the display operation unit 203.

A user may incline the upper or lower side of the portable communication terminal 2 downward so as to select one of the four icons 2035a, 2035b, 2035c, and 2035d.

In FIG. 15, to indicate that the "Tray 1 A4-R" icon 2035a at the uppermost position is selected, the icon is colored by changing the icon color.

Alternatively, the icon selection state may be indicated by surrounding the icon with a rectangular-frame cursor.

At that time, the portable communication terminal may be inclined once so that the selected icon is moved to the next upper or lower icon. Alternatively, when the portable communication terminal 2 is inclined for a predetermined period or longer (for example, one second or longer), the color, the cursor, or the like that indicates which icon is selected is continuously moved through multiple icons.

When it is not possible to display all icons, the number of which is large and which are to be displayed for selection, in the screen on the display operation unit 203, icons outside the screen may be displayed by scrolling the screen vertically.

As the inclination angle or the inclination rate of the portable communication terminal 2 is increased, the speed at which the color, the cursor, or the like that indicates which icon is selected moves through multiple icons may be higher.

Thus, the portable communication terminal 2 is just inclined so that the color, the cursor, or the like that indicates which icon is selected is continuously moved in the inclination direction as if it falls down. Therefore, intuitive, rapid control on the digital multifunction device is achieved, improving user convenience.

Fifth Embodiment

In addition to an operation of inclining the portable communication terminal 2, a user may directly touch an icon displayed on the display operation unit 203. Thus, a control instruction may be given to the digital multifunction device 1.

For example, in FIG. 9, a user inclines the lower side of the portable communication terminal 2 downward so as to select the copy function. Then, an "OK" icon or the like that is illustrated in FIG. 11 or 12 is touched with their thumb. Thus, a print instruction may be transmitted to the digital multifunction device 1 more quickly than in the case in which touch operations or control operations through inclination of the portable communication terminal 2 are separately performed.

For example, in the case of a method of the related art, in which, in a state in which the portable communication terminal 2 is held with their hand, multiple icons are touched with their thumb, (1) after a first icon is touched with their thumb, (2) their thumb is released from the first icon, and (3) their thumb is then moved to touch a second icon. Thus, at least three stages of procedure need to be performed.

In contrast, in the case of the method according to the fifth embodiment in which operations of inclining the portable communication terminal 2 are combined with touch operations, (1) after the portable communication terminal 2 is inclined so that a first icon is selected, and (2) a second icon is touched with their thumb. Thus, only two stages of procedure need to be performed.

Thus, operations of inclining the portable communication terminal 2 are combined with touch operations using their finger. Compared with the case of only touch operations using their finger, intuitive, rapid control on the digital multifunction device 1 may be achieved.

Sixth Embodiment

On the basis of FIGS. 16 and 17, an overview of control on the digital multifunction device 1 according to a sixth embodiment of the present disclosure will be described.

Figure 16:
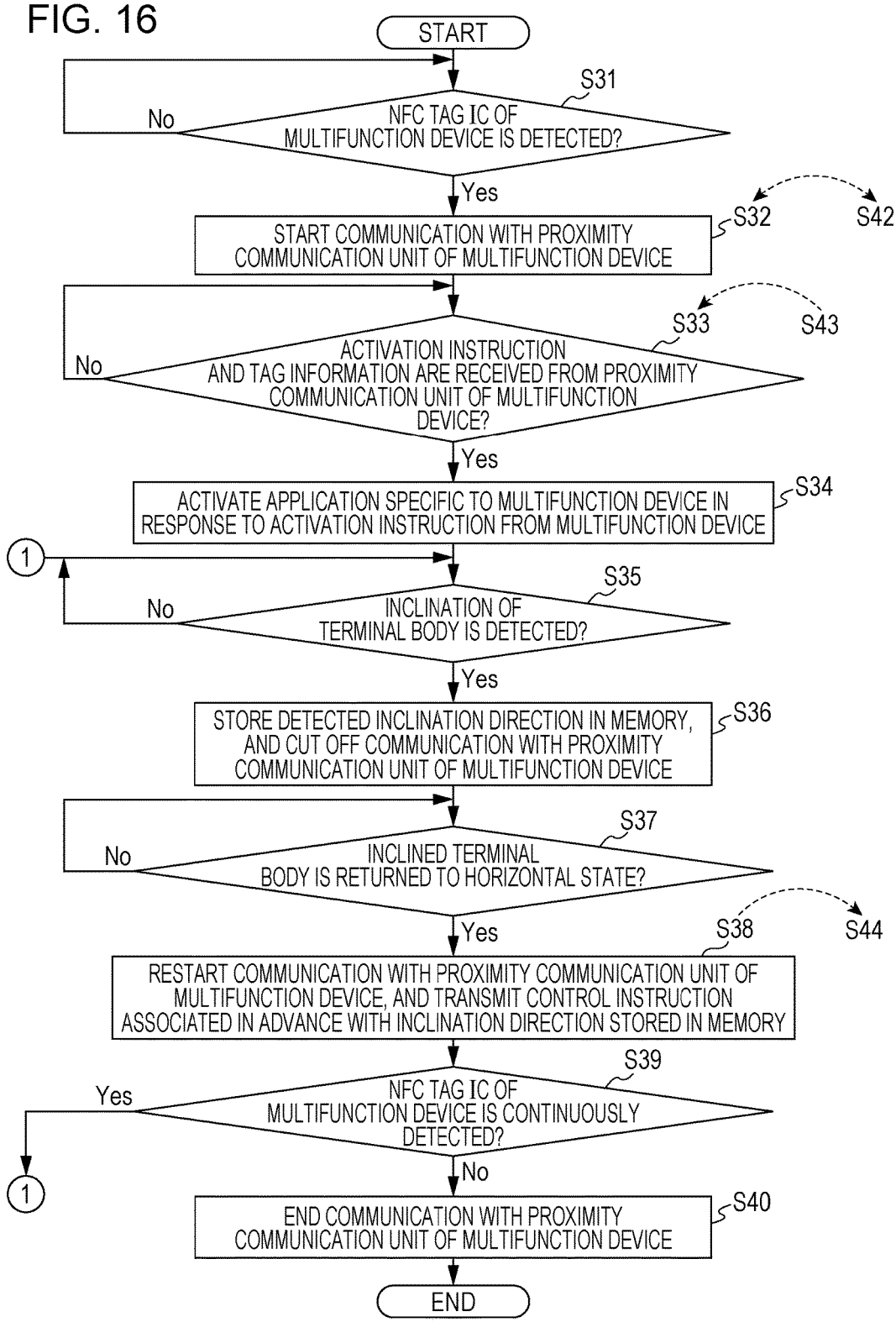
FIG. 16 is a flowchart indicating an overview of a process performed by a portable communication terminal according to a sixth embodiment of the present disclosure.

FIG. 16 is a flowchart indicating an overview of a process performed by the portable communication terminal 2 according to the sixth embodiment. FIG. 17 is a flowchart indicating an overview of a process performed by the digital multifunction device 1 according to the sixth embodiment.

Steps S31, S32, and S35 to S40 in FIG. 16 correspond to steps S11, S12, and S15 to S20 in FIG. 7, respectively, and will not be described.

Figure 17:
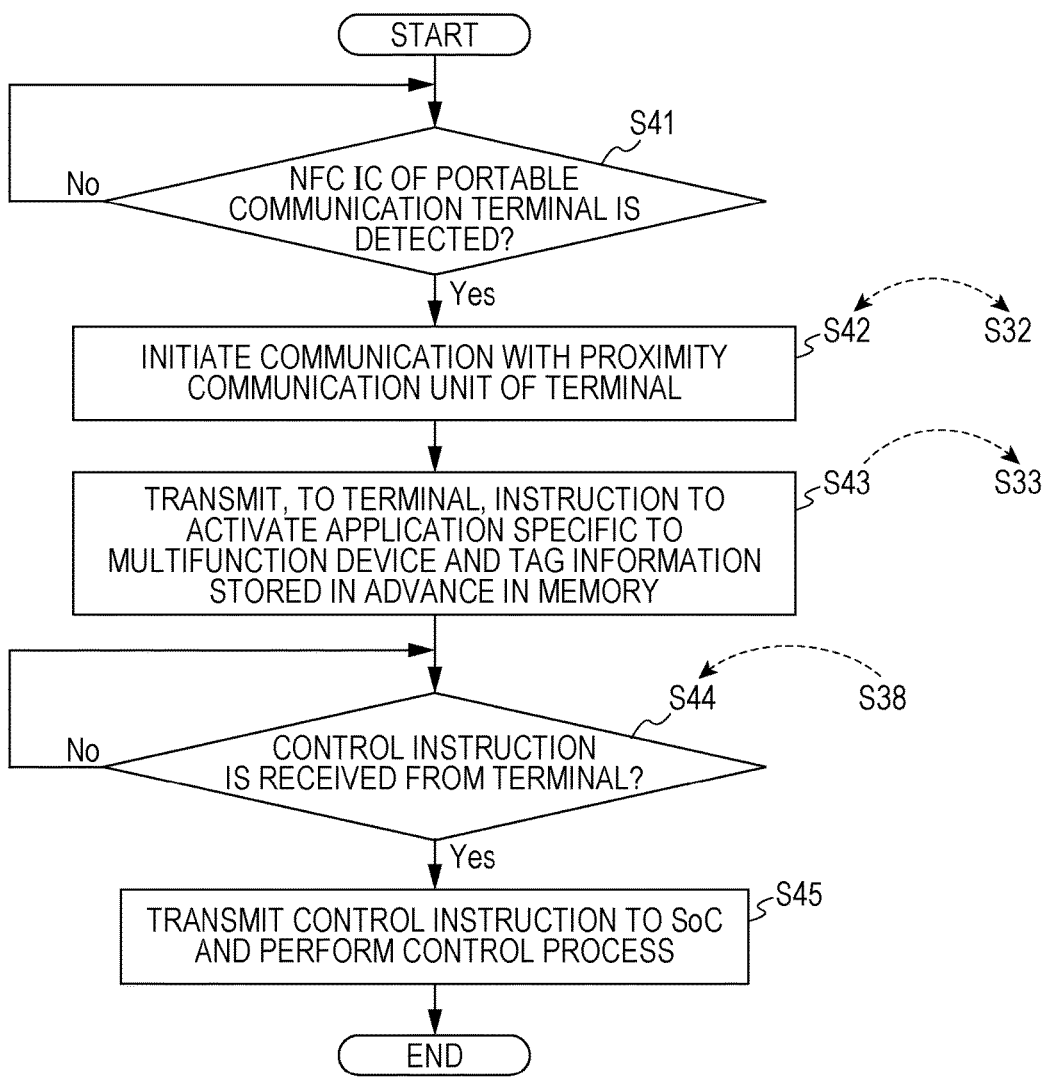
FIG. 17 is a flowchart indicating an overview of a process performed by a digital multifunction device according to the sixth embodiment of the present disclosure.

Steps S41, S42, S44, and S45 in FIG. 17 correspond to steps S21, S22, S24, and S25 in FIG. 8, respectively, and will not be described.

Steps S33 and S34 in FIG. 16 and step S43 in FIG. 17 which are not described in FIGS. 7 and 8 will be described.

In step S32 in FIG. 16, after the proximity communication unit 290 initiates communication with the proximity communication unit 190 of the digital multifunction device 1 (step S32), in the subsequent step S33, the controller 200 determines whether or not the proximity communication unit 290 has received an instruction to activate an application specific to the digital multifunction device 1 and tag information of the NFC tag IC 192 from the proximity communication unit 190 of the digital multifunction device 1 (step S33).

If the proximity communication unit 290 has received an instruction to activate an application specific to the digital multifunction device 1 and tag information of the NFC tag IC 192 from the proximity communication unit 190 of the digital multifunction device 1 (in the case of Yes in the determination in step S33), in step S34, the controller 200 activates the application specific to the digital multifunction device 1 in response to the received activation instruction on the basis of the tag information (step S34).

In contrast, if the proximity communication unit 290 has not received an instruction to activate an application specific to the digital multifunction device 1 and tag information of the NFC tag IC 192 from the proximity communication unit 190 of the digital multifunction device 1 (in the case of No in the determination in step S33), the controller 200 repeatedly performs the determination in step S33 (step S33).

In step S42 in FIG. 17, after the proximity communication unit 190 initiates communication with the proximity communication unit 290 of the portable communication terminal 2 (step S42), in the subsequent step S43, the controller 100 causes an instruction to activate an application specific to the digital multifunction device 1 and tag information of the NFC tag IC 192 which are stored in advance in the memory 104, to be transmitted to the portable communication terminal 2 (step S43).

Thus, when the portable communication terminal 2 is brought close within the NFC communication range of the digital multifunction device 1, an instruction to activate an application for controlling the digital multifunction device 1 is transmitted to the portable communication terminal 2. Therefore, an operation for activating the application does not need to be performed, achieving the digital multifunction device 1 that improves user convenience.

Seventh Embodiment

On the basis of FIG. 18, an overview 7 of control on the digital multifunction device 1 according to a seventh embodiment of the present disclosure will be described.

Figure 18:
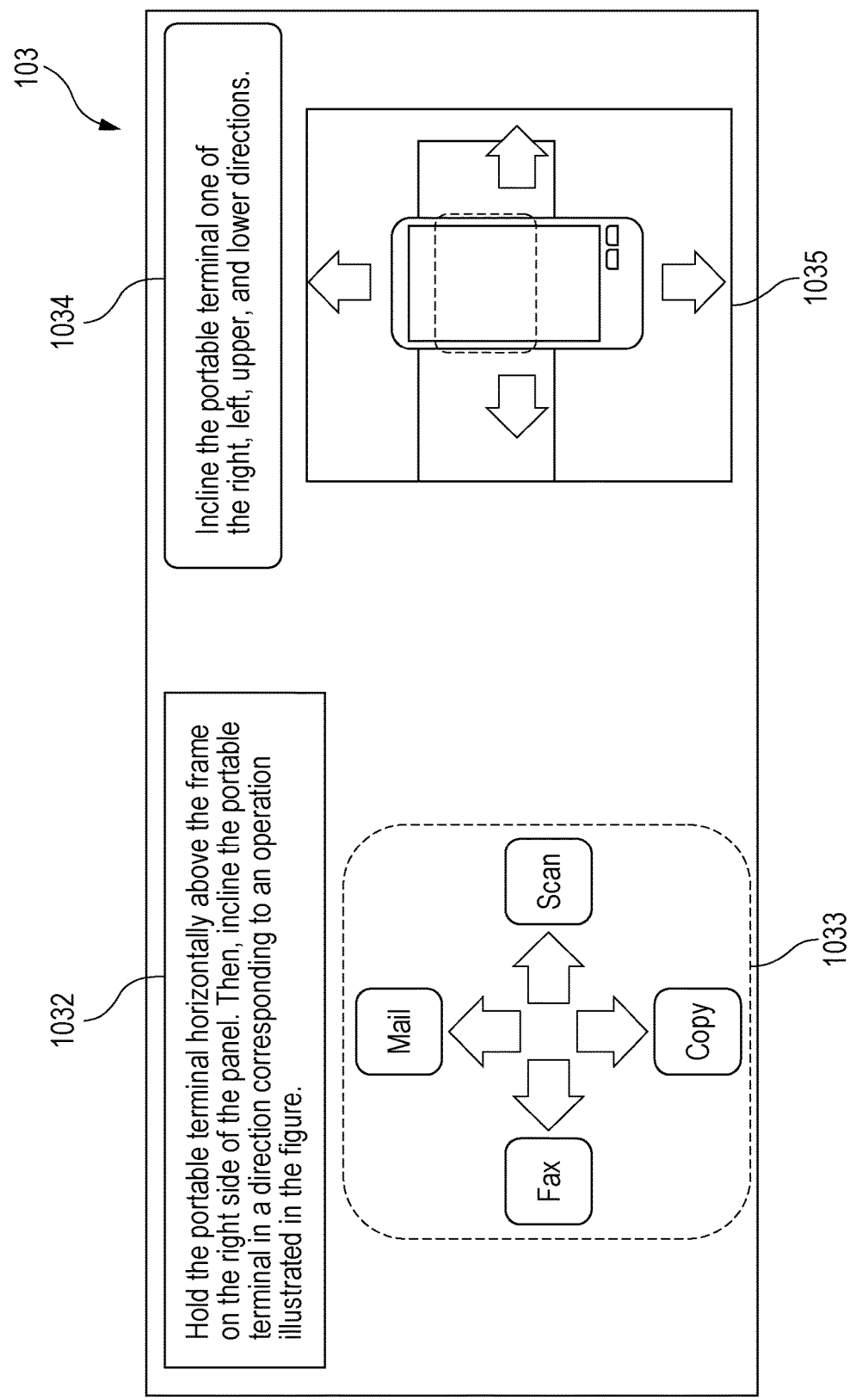
FIG. 18 is a diagram for describing an exemplary display of the display operation unit of the panel unit of a digital multifunction device according to a seventh embodiment of the present disclosure.

FIG. 18 is a diagram for describing an exemplary display on the display operation unit 103 of the panel unit 180 of the digital multifunction device 1 according to the seventh embodiment of the present disclosure.

When the proximity communication unit 190 initiates communication with the proximity communication unit 290 of the portable communication terminal 2, as illustrated in FIG. 18, a screen indicating how to control the digital multifunction device 1 may be displayed on the display operation unit 103 of the panel unit 180 of the digital multifunction device 1.

In FIG. 18, on the display operation unit 103, a message 1032 indicating how to operate the digital multifunction device 1 by using an inclination of the portable communication terminal 2 and a FIG. 1033 indicating the inclination directions are displayed.

An animation 1035 indicating how to incline the portable communication terminal 2 and a message 1034 displayed in accordance with the animation 1035 may be displayed on the display operation unit 103.

Thus, a user is notified, through the display operation unit 103, of one or more inclination directions in which the body of the portable communication terminal 1 is to be inclined. Therefore, the digital multifunction device 1 that improves user convenience may be achieved.

The present disclosure contains subject matter related to that disclosed in Japanese Priority Patent Application JP 2016-221589 filed in the Japan Patent Office on Nov. 14, 2016, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A portable communication terminal that transmits a control instruction for an electronic apparatus, the portable communication terminal comprising:
    a terminal communication unit that communicates with the electronic apparatus;
    an inclination detecting unit that detects an inclination of a base of the portable communication terminal with respect to a predetermined reference direction and a direction of the inclination;
    a terminal storage unit that stores the control instruction associated in advance with the inclination direction; and
    a terminal controller that controls the terminal communication unit, the inclination detecting unit, and the terminal storage unit,
    wherein, when the inclination detecting unit detects that the base is inclined with respect to the predetermined reference direction, the terminal controller determines the control instruction associated in advance with the inclination direction, and, when the inclination detecting unit detects that the base has returned to the predetermined reference direction, the terminal controller causes the terminal communication unit to transmit the determined control instruction to the electronic apparatus.

2. The portable communication terminal according to claim 1,
    wherein the terminal communication unit has a proximity wireless communication function of initiating communication when the electronic apparatus comes close within a predetermined range,
    wherein the terminal storage unit stores an application program for controlling the electronic apparatus through the inclination of the base, and
    wherein, the terminal communication unit initiates communication with the electronic apparatus, the terminal controller activates the application program.

3. The portable communication terminal according to claim 1, further comprising:
    a terminal modifying unit,
    wherein the terminal controller causes the terminal notifying unit to provide notification of one or more inclination directions in which the base is to be inclined with respect to the reference direction, and
    wherein, when the inclination detecting unit detects that the base is inclined in one of the one or more inclination directions, the terminal controller causes the terminal communication unit to transmit the control instruction to the electronic apparatus, the control instruction being associated in advance with the inclination direction.

4. The portable communication terminal according to claim 1,
    wherein the inclination detecting unit further detects an inclination angle of the base of the portable communication terminal with respect to the reference direction,
    wherein, when the inclination detecting unit detects that the base is inclined by a predetermined first angle or more with respect to the reference direction, the terminal controller causes the terminal storage unit to store the inclination direction, and, thereafter, when the inclination detecting unit detects that the inclination of the base is returned to within a predetermined second angle smaller than the first angle, the terminal controller causes the terminal communication unit to transmit the control instruction to the electronic apparatus, the control instruction being associated in advance with the inclination direction.

5. The portable communication terminal according to claim 1,
    wherein the electronic apparatus is an image forming apparatus, and wherein the control instruction encompasses an instruction for image formation.

6. A method of controlling and electronic apparatus, the method being performed by a portable communication terminal, the method comprising:
    by using the portable communication terminal, initiating communication when the electronic apparatus comes close within a predetermined range, then activating an application program for controlling the electronic apparatus through an inclination of a base of the portable communication terminal, and notifying a user of one or more inclination directions in which the case is to be inclined with respect to a reference direction; and
    when the base is inclined in one of the one or more inclination directions and returned to the reference direction, transmitting, by using the portable communication terminal, a control instruction to the electronic apparatus, the control instruction being an instruction for the electronic apparatus, the control instruction being associated in advance with the inclination direction.

7. An electronic apparatus that is controlled by receiving a control instruction from a portable communication terminal, the electronic apparatus comprising:
    an apparatus communication unit that, when a base of the portable communication terminal is inclined with respect to a predetermined reference direction of the base of the portable communication terminal and returned to the predetermined reference direction, receives the control instruction from the portable communication terminal, the control instruction being associated in advance with a direction of the inclination; and
    an apparatus controller that performs predetermined processing in accordance with the control instruction.

8. The electronic apparatus according to claim 7,
    wherein the apparatus communication unit has a proximity wireless communication function of initiating communication when the portable communication terminal is brought close within a predetermined range, and
    wherein, when the apparatus communication unit initiates communication with the portable communication terminal, the apparatus controller causes the apparatus communication unit to transmit an instruction to the potable communication terminal, the instruction being an instruction to activate an application program for controlling the electronic apparatus through and inclination of the base.

9. The electronic apparatus according to claim 7, further comprising:

an apparatus notifying unit, wherein the apparatus controller causes the apparatus notifying unit to provide notification of one or more inclination directions in which the base of the portable communication terminal is to be inclined, and wherein, when the base is inclined in one of the one or more inclination directions, the apparatus controller receives the control instruction from the portable communication terminal, the control instruction being associated in advance with the inclination direction.

10. The electronic apparatus according to claim 7, wherein the electronic apparatus is an image forming apparatus, and wherein the control instruction encompasses an instruction for image formation.

11. A method of controlling an electronic apparatus by receiving a control instruction from a portable communication terminal, the method comprising:

by using the electronic apparatus, initiating communication when the portable communication terminal is brought close within a predetermined range, then transmitting and instruction to the portable communication terminal, the instruction being an instruction to activate an application program for controlling the electronic apparatus through an inclination of a base of the portable communication terminal, and notifying a user of one or more inclination directions in which the base is to be inclined with respect to a reference direction; and when the base is inclined in one of the one or more inclination directions and returned to the reference direction, receiving the control instruction from the portable communication terminal, the control instruction being associated in advance with the inclination direction, and performing predetermined processing in accordance with the control instruction.

* * * * *